(12) United States Patent
Fischer et al.

(10) Patent No.: US 7,610,628 B2
(45) Date of Patent: Oct. 27, 2009

(54) APPARATUS AND METHOD FOR CALCULATING A REPRESENTATION OF A RESULT OPERAND

(75) Inventors: Wieland Fischer, Munich (DE); Berndt Gammel, Markt Schwaben (DE)

(73) Assignee: Infineon Technologies AG (DE)

( * ) Notice: Subject to any disclaimer, the term of this patent is extended or adjusted under 35 U.S.C. 154(b) by 905 days.

(21) Appl. No.: 11/187,039

(22) Filed: Jul. 20, 2005

(65) Prior Publication Data

US 2006/0200514 A1    Sep. 7, 2006

Related U.S. Application Data

(60) Provisional application No. 60/657,685, filed on Mar. 1, 2005.

(51) Int. Cl.
G06F 7/04    (2006.01)
(52) U.S. Cl. .................... 726/26; 708/446; 726/34; 713/320
(58) Field of Classification Search ............ 726/34
See application file for complete search history.

(56) References Cited

U.S. PATENT DOCUMENTS

| | | | |
|---|---|---|---|
| 6,295,606 B1 | 9/2001 | Messerges et al. | |
| 7,071,725 B2 * | 7/2006 | Fujisaki | 326/8 |
| 7,132,858 B2 * | 11/2006 | Bock | 326/93 |
| 2005/0193052 A1 * | 9/2005 | Elbe et al. | 708/700 |
| 2005/0232416 A1 * | 10/2005 | Sonnekalb et al. | 380/46 |
| 2005/0257077 A1 * | 11/2005 | Dutta et al. | 713/340 |

OTHER PUBLICATIONS

E. Trichina, et al.; "Small Size, Low Power, Side Channel-Immune AES Coprocessor: Design and Synthesis Results"; Proceedings of the Fourth Conference on the Advanced Encryption Standard (AES), Bonn, Germany, May 2004, pp. 113-127.
M.-L. Akkar and C. Giraud; "An Implementation of DES and AES, Secure against Some Attacks"; Cryptographic Hardware and Embedded Systems—CHES 2001, (C.K. Koc, D. Naccache, and C. Paar, Eds.), Lecture Notes in Computer Science, vol. 2162, pp. 309-318, Springer, 2001.
M.-L. Akkar, R. Bevan, L. Goubin; "Two Power Analysis Attacks against One-Mask Methods"; 11th International Workshop on Fast Software Encryption—FSE 2004, (B.K. Roy and W. Meier, Eds.); Lecture Notes in Computer Science, vol. 3017, pp. 332-347, Springer, 2004.

(Continued)

Primary Examiner—Nasser G Moazzami
Assistant Examiner—Fikremariam Yalew
(74) Attorney, Agent, or Firm—Dickstein, Shapiro, LLP.

(57) ABSTRACT

An apparatus for calculating a representation of a result operand of the non-linear logical operation between a first operand and a second operand includes a first logic gate and a second logic gate. Each operand is represented by two auxiliary operands, which, when linearly combined together result in the respective operand. The first and second logic gates are designed such that an average energy consumption of the first or second logic gate is substantially equal to a plurality of combinations of auxiliary operands at the beginning of a first operation cycle and auxiliary operands at the beginning of a second operating cycle, the average energy being derivable from a plurality of different orders of occurrences of the first to fourth auxiliary operands.

25 Claims, 9 Drawing Sheets

OTHER PUBLICATIONS

R. Bevan and E. Knudsen; "Ways to Enhance Differential Power Analysis"; ICISC 2002, (P.J. Lee and C.H. Lim, Eds.), Lecture Notes in Computer Science, vol. 2587, pp. 327-342, Springer, 2003.

J. Blomer, J.C. Merchan, and V. Krummel; "Provably Secure Masking of AES"; Selected Areas in Cryptography—SAC 2004, Lecture Notes in Computer Science, vol. 3357, pp. 69-83, Springer, 2004.

S. Chari, C.S. Jutla, J.R. Rao, and P. Rohatgi; "Towards Sound Approaches to Counteract Power-Analysis Attacks"; Advances in Cryptology—Crypto '99, (M.J. Wiener, Ed.), Lecture Notes in Computer Science, vol. 1666, pp. 398-412, Springer, 1999.

C. Clavier, J.-S. Coron, and N. Dabbous; "Differential Power Analysis in the Presence of Hardware Countermeasures"; Cryptographic Hardware and Embedded Systems—CHES 2000, (C.K. Koc and C. Paar Eds.), Lecture Notes in Computer Science, vol. 1965, pp. 252-263, Springer, 2000.

J.-S. Coron; "Resistance against Differential Power Analysis for Elliptic Curve Cryptosystems", Cryptographic Hardware and Embedded Systems—CHES 1999, (C.K. Koc and C. Paar, Eds.), Lecture Notes in Computer Science, vol. 1717, pp. 292-302, Springer, 1999.

J.D. Golic; "DeKaRT: A New Paradigm for Key-Dependent Reversible Circuits"; Cryptographic Hardware and Embedded Systems—CHES 2003, (C.D. Walter, C.K. Koc, and C. Paar, Eds.), Lecture Notes in Computer Science, vol. 2779, pp. 98-112, Springer, 2003.

J.D. Golic and R. Menicocci; "Universal Masking on Logic Gate Level"; Electronics Letters 40 (9), pp. 526-527 (2004).

J.D. Golic and C. Tymen; "Multiplicative Masking and Power Analysis of AES"; Cryptographic Hardware and Embedded Systems—CHES 2002, (B.S. Kaliski Jr., C.K.Koc, and C. Paar, Eds.), Lecture Notes in Computer Science, vol. 2535, pp. 198-212, Springer, 2003.

L. Goubin and J. Patarin; "DES and Differential Power Analysis—The Duplication Method"; Cryptographic Hardware and Embedded Systems—CHES 1999, (C.K. Koc and C. Paar, Eds.), Lecture Notes in Computer Science, vol. 1717, pp. 158-172, Springer, 1999.

Y. Ishai, A. Sahai, and D. Wagner; "Private Circuits: Securing Hardware against Probing Attacks"; Advances in Cryptology—Crypto 2003, (D. Boneh, Ed.), Lecture Notes in Computer Science, vol. 2729, pp. 463-481, Springer, 2003.

P.C. Kocher, J. Jaffe, and B. Jun; "Differential Power Analysis"; Advances in Cryptology—Crypto '99, (M.J. Wiener, Ed.), Lecture Notes in Computer Science, vol. 1666, pp. 388-397, Springer, 1999.

S. Mangard; "Hardware Countermeasures Against DPA—A Statistical Analysis of Their Effectiveness"; Topics in Cryptology—CT-RSA 2004, (T. Okamoto, Ed.), Lecture Notes in Computer Science, vol. 2964, pp. 222-235, Springer, 2004.

S. Mangard, T. Popp, B.M. Gammel; "Side-Channel Leakage of Masked CMOS Gates"; Topics in Cryptology—CT-RSA 2005, (A. Menezes, Ed.), Lecture Notes in Computer Science, vol. 3376, pp. 351-365, Springer, 2005.

T.S. Messerges; "Securing the AES Finalists Against Power Analysis Attacks"; 7th International Workshop on Fast Software Encryption—FSE 2000, (B. Schneier, Ed.), Lecture Notes in Computer Science, vol. 1978, pp. 150-164, Springer, 2001.

T.S. Messerges, E.A. Dabbish, and R.H. Sloan; "Power Analysis Attacks of Modular Exponentiation in Smartcards"; Cryptographic Hardware and Embedded Systems—CHES 1999, (C.K. Koc and C. Paar, Eds.), Lecture Notes in Computer Science, vol. 1717, pp. 144-157, Springer, 1999.

T.S. Messerges, E. A. Dabbish, and R. H. Sloan; "Examining Smart-Card Security under the Threat of Power Analysis Attacks"; IEEE Transactions on Computers, 51(5), pp. 541-552, 2002.

B. Preneel, R. Govaerts, J. Vandewalle; "Boolean Functions Satisfying Higher Order Propagation Criteria"; Advances in Cryptology—Eurocrypt '91, (D.W. Davies, Ed.), Lecture Notes in Computer Science, vol. 547, pp. 141-152, Springer, 1991.

A. Shamir; "Protecting Smart Cards from Passive Power Analysis with Detached Power Supplies"; Cryptographic Hardware and Embedded Systems—CHES 2000, (C.K. Koc and C. Paar, Eds.), Lecture Notes in Computer Science, vol. 1965, pp. 71-77, Springer, 2000.

D. Suzuki, M. Saeki, and T. Ichikawa; "Random Switching Logic: A Countermeasure against DPA based on Transition Probability"; Cryptology ePrint Archive, Report 2004/346 (http://eprint.iacr.org/).

K. Tiri and I. Verbauwhede; "Securing Encryption Algorithms against DPA at the Logic Level: Next Generation Smart Card Technology"; Cryptographic Hardware and Embedded Systems—CHES 2003, (C.D. Walter, C.K. Koc, and C. Paar, Eds.), Lecture Notes in Computer Science, vol. 2779, pp. 137-151, Springer, 2003.

K. Tiri and I. Verbauwhede; "A Logic Level Design Methodology for a Secure DPA Resistant ASIC or FPGA Implementation"; Proc. of Design, Automation and Test in Europe Conference—Date 2004, IEEE Computer Society, pp. 246-251, 2004.

E. Trichina; "Combinational Logic Design For AES SubByte Transformation on Masked Data"; Cryptology ePrint Archive, Report 2003/236 (http://eprint.iacr.org/.).

E. Trichina, D. De Seta, and L. Germani; "Simplified Adaptive Multiplicative Masking for AES"; Cryptographic Hardware and Embedded Systems—CHES 2002, (B.S. Kaliski Jr., C.K. Koc, and C. Paar, Eds.), Lecture Notes in Computer Science, vol. 2535, pp. 187-197, Springer, 2003.

* cited by examiner e.g. $a = a_1 \text{ XOR } a_2$
$b = b_1 \text{ XOR } b_2$
$c = c_1 \text{ XOR } c_2$ one parameter of $(a_1, a_2)$ and $(b_1, b_2)$ may be a (pseudo-) random key FIG 2A
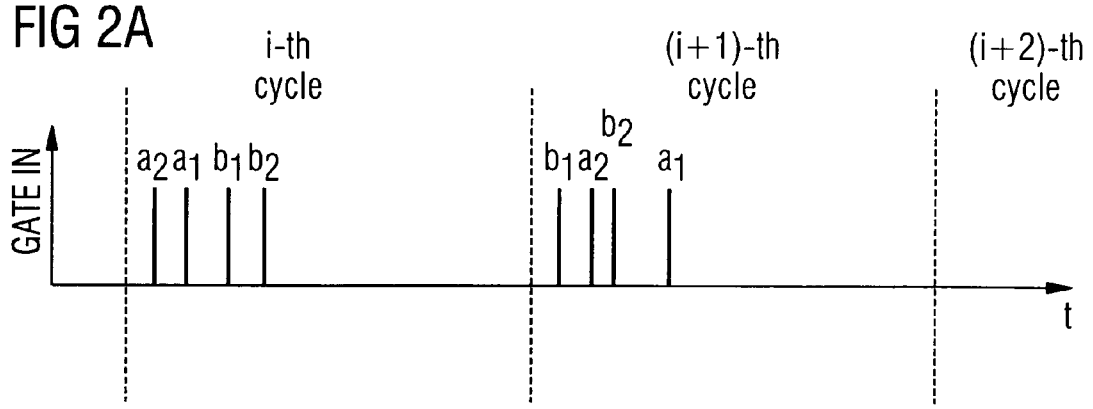
FIG 2B
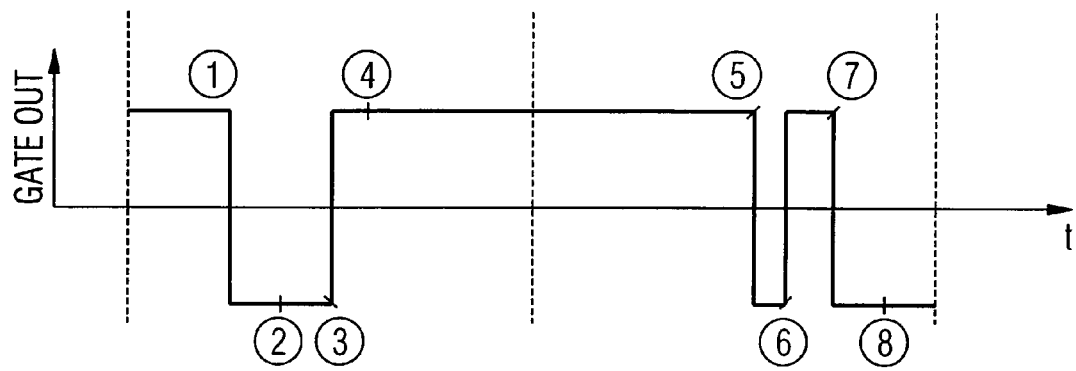
FIG 2C
| GLITCH No | TIME REF | ENERGY | TIME REF | ENERGY |
|---|---|---|---|---|
| 1 | ① | $E_{g1 \to 0}$ | ⑤ | $E_{g1 \to 0}$ |
| 2 | ② | $E_{g0 \to 0}$ | ⑥ | $E_{g0 \to 1}$ |
| 3 | ③ | $E_{g0 \to 1}$ | ⑦ | $E_{g1 \to 1}$ |
| 4 | ④ | $E_{g1 \to 1}$ | ⑧ | $E_{g0 \to 0}$ |
i-th cycle     (i+1)-th cycle

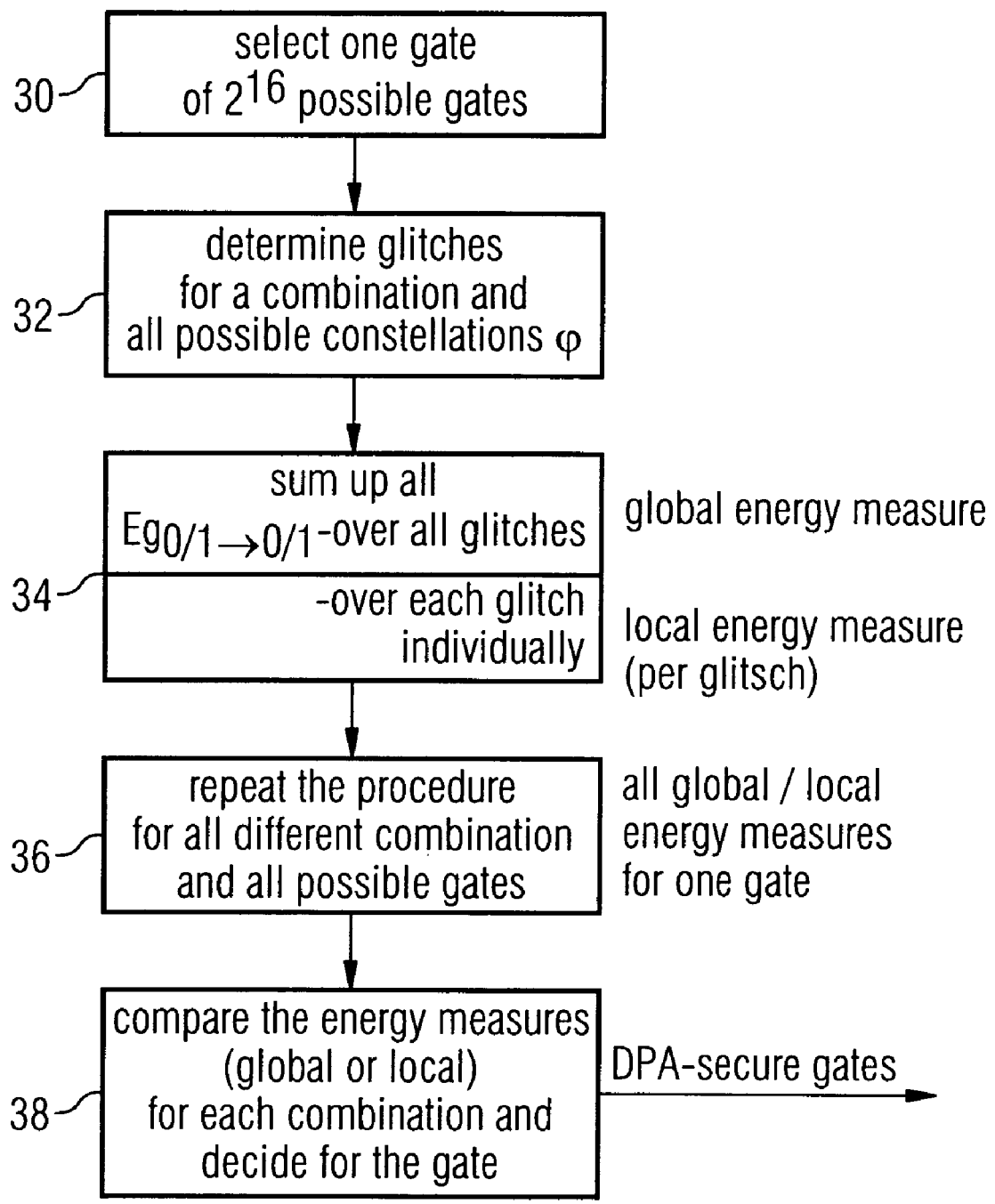

FIG 4A

| | | |
|---|---|---|
| $c+a_1+b_1$ | $c+a_1$ | $c,\ c+a_1b_1,\ c+a_1+a_1b_1,\ c+b_1+a_1b_1,\ c+a_1+b_1+a_1b_1$ |
| $c+a_1+b_2$ | $c+a_2$ | $c+a_1b_2,\ c+a_1+a_1b_2,\ c+b_1+a_2b_1,\ c+a_1+b_2+a_1b_2$ |
| $c+a_2+b_1$ | $c+b_1$ | $c+a_2b_1,\ c+a_2+a_2b_1,\ c+b_2+a_1b_2,\ c+a_2+b_1+a_2b_1$ |
| $c+a_2+b_2$ | $c+b_2$ | $c+a_2b_2,\ c+a_2+a_2b_2,\ c+b_2+a_2b_2,\ c+a_2+b_2+a_2b_2$ |

FIG 4C a2+b2+a2*b2+c2+a2*c2+b2*c2+a2*b2*c2
a2+a2*b2+a2*c2+a2*b2*c2
b2+c2+b2*c2
a2+b2+a2*c2+b2*c2
a2*b2+c2+a2*b2*c2
a2+a1*b1+a2*b1+b2+a1*b2+a2*b2+a2*c2+a1*b1*c2+a2*b1*c2+b2*c2+a1*b2*c2+a2*b2*c2
a2*b2+a2*b2*c2
a2+b2+c2+a2*c2+b2*c2
a2+a2*c2
b2+a2*b2+c2+b2*c2+a2*b2*c2
a2+b2+a2*b2+a2*c2+b2*c2+a2*b2*c2
c2
a2+b2+c2+a2*b2*c2
a2*b2+a2*c2*+b2*c2
a2*b2+c2+a2*c2+b2*c2
a2+b2+a2*b2*c2
a2+c2+b2*c2+a2*b2*c2
b2+a2*b2+a2*c2
a2+b2+a2*b2+c2
a2*c2+b2*c2+a2*b2*c2
a2+b2+a2*b2+c1+b2*c1+b2*c2
a2+b2+a2*b2+a2*c1+b2*c1+c2+a2*c2+b2*c2
a1+b2+a1*b2+c1+a1*c1+a2*c1+b2*c1+a1*b2*c1+a2*b2*c1+a1*c2*+a2*c2+b2*c2+a1*b2*c2+a2*b2*c2
a1+b2+a1*b2+a1*c1+b2*c1+a1*b2*c1+a2*b2*c1+c2+a1*c2+b2*c2*+a1*b2*c2+a2*b2*c2
a2*b2+a2*c2
a2+b2+c2+b2*c2+a2*b2*c2
a2+a2*b2*c2
b2+a2*b2+c2+a2*c2+b2*c2
b2+a2*c2+b2*c2+a2*b2*c2
a2+a2*b2+c2
a2+b2+a2*b2+b2*c2
c2+a2*c2*+a2*b2*c2
a2*b2+a2*b1*c1+a2*b2*c1+a2*c2+a2*b1*c2+a2*b2*c2
a2+a2*b2+a2*c1+b2*c1+c2+a2*c2+b2*c2
a2+a2*b2+c1+a2*c1+a2*c2
a2+a2*b2+a2*c1+b2*c1+a1*b2*c1+a2*b2*c1+c2+a2*c2+b2*c2+a1*b2*c2+a2*b2*c2
b2+c2
a2+a2*b2+a2*c2+b2*c2+a2*b2*c2
a2+b2+a2*b2+c2+a2*c2+a2*b2*c2
b2*c2
b2+b1*c1+b2*c1+c2+b1*c2+b2*c2
a1+b1+a1*b1+a1*c1+b1*c1+a1*b1*c1+a2*b2*c1+c2+a1*c2+b1*c2+a1*b1*c2+a2*b2*c2
a2+a2*b1+c1+a2*c1+a2*b1*c1+a2*b2*c1+a2*c2+a2*b1*c2+a2*b2*c2
a2+a2*b1+a2*c1+a2*b1*c1+b2*c1+a1*b2*c1+c2+a2*c2+a2*b1*c2+b2*c2+a1*b2*c2
a2*b2+a2*c2+b2*c2+a2*b2*c2
a2+b2+c2
a2+b2*c2
b2+a2*b2+c2+a2*c2+a2*b2*c2
a2+b2+a2*b2+a2*b2*c2
c2+a2*c2+b2*c2
a2+b2+a1*b1*c1+a2*b1*c1+a1*b2*c1+a2*b2*c1+c2+a1*b1*c2+a2*b1*c2+a1*b2*c2+a2*b2*c2
a2+b2+b1*c1+b2*c1+c2+b1*c2+b2*c2
a2+b2+a1*c1+a2*c1+b1*c1+b2*c1+c2+a1*c2+a2*c2+b1*c2+b2*c2
a2+b2+a2*b2+c2+a2*c2+b2*c2
a2*b2*c2
a2+a1*b1+a2*b1+b2+a1*b2+a2*b2+a1*c1+a2*c1+b1*c1+b2*c1+c2+a1*c2+a2*c2+b1*c2+b2*c2
- exchanging a1 and a2
- exchanging b1 and b2
- exchanging c1 and c2
- permuting the pairs (a1,a2), (b1,b2), (c1,c2)
- inverting of a1, a2, b1, b2, c1, c2
- addition of 1 to the result

FIG 5

$c = f(a,b) = a \text{ AND } b;$    $a_1 \text{ XOR } a_2 = a;$    $c = c_1 \text{ XOR } c_2$
$b_1 \text{ XOR } b_2 = b;$ 1: G(a1, a2, b1, b2) := (a1+b1, a1*b1+a1*b2+a2*b1+a2*b2+a1+b1)
2: G(a1, a2, b1, b2) := (a1+b2, a1*b1+a1*b2+a2*b1+a2*b2+a1+b2)
3: G(a1, a2, b1, b2) := (a2+b1, a1*b1+a1*b2+a2*b1+a2*b2+a2+b1)
4: G(a1, a2, b1, b2) := (a2+b2, a1*b1+a1*b2+a2*b1+a2*b2+a2+b2)
5: G(a1, a2, b1, b2) := (a1+b1+1, a1*b1+a1*b2+a2*b1+a2*b2+a1+b1+1)
6: G(a1, a2, b1, b2) := (a1+b2+1, a1*b1+a1*b2+a2*b1+a2*b2+a1+b2+1)
7: G(a1, a2, b1, b2) := (a2+b1+1, a1*b1+a1*b2+a2*b1+a2*b2+a2+b1+1)
8: G(a1, a2, b1, b2) := (a2+b2+1, a1*b1+a1*b2+a2*b1+a2*b2+a2+b2+1)
                            $g_1$                                      $g_2$

FIG 6

$f(a, b) = a \text{ OR } b = c$

$f(a,b) = a\ \text{NAND}\ b = c$

$f(a, b) = a\ \text{NOR}\ b = c$

1: G(a1, a2, b1, b2) := (a2+b2, a1*b1+a1*b2+a2*b1+a2*b2+a1+b1+1)
2: G(a1, a2, b1, b2) := (a2+b1, a1*b1+a1*b2+a2*b1+a2*b2+a1+b2+1)
3: G(a1, a2, b1, b2) := (a1+b2, a1*b1+a1*b2+a2*b1+a2*b2+a2+b1+1)
4: G(a1, a2, b1, b2) := (a1+b1, a1*b1+a1*b2+a2*b1+a2*b2+a2+b2+1)
5: G(a1, a2, b1, b2) := (a2+b2+1, a1*b1+a1*b2+a2*b1+a2*b2+a1+b1)
6: G(a1, a2, b1, b2) := (a2+b1+1, a1*b1+a1*b2+a2*b1+a2*b2+a1+b2)
7: G(a1, a2, b1, b2) := (a1+b2+1, a1*b1+a1*b2+a2*b1+a2*b2+a2+b1)
8: G(a1, a2, b1, b2) := (a1+b1+1, a1*b1+a1*b2+a2*b1+a2*b2+a2+b2)

APPARATUS AND METHOD FOR CALCULATING A REPRESENTATION OF A RESULT OPERAND

FIELD OF THE INVENTION

The present invention relates to logic gates, and, in particular, to logic gates, which have an increased security level against differential power analysis.

BACKGROUND OF THE INVENTION AND PRIOR ART

Cryptoanalysis based on side-channel information has successfully been applied to attack cryptographic devices. These attacks exploit information leaked during the computation of cryptographic algorithms, such as timing information, power consumption, or electromagnetic emanations of the device. Kocher [13] has shown that the power consumption of unprotected cryptographic devices provides a side channel, which can be used with extraordinary simple equipment. Differential power analysis (DPA) allows the attacker to exploit correlations between the observable instantaneous power consumption and intermediate results involving the secret. During the last years it has become more and more obvious that differential power attacks are extremely difficult to protect against [6, 19, 3, 14].

The first class of ad-hoc approaches, called hardware countermeasures, tries to reduce the signal-to-noise ratio of the side-channel leakage and finally to bury the usable information in the noise. Hardware countermeasures include methods like detached power supplies [22], the addition of power noise generators, or the application of a probabilistic disarrangement of the times at which the attacked intermediate results are processed by using random delay insertions or randomization of the execution path. While such measures surely increase the experimental and computational workload of the attacker they do not render the attack infeasible. In practice, typically several countermeasures are combined [6, 3, 14]. This can reduce the correlation down to a level that makes a DPA virtually impossible. However, higher order differential attacks or the possibility of obtaining a spatial resolution of the power consumption by observing local electromagnetic emanations may again open a backdoor for professional attackers.

The second class of countermeasures aims at removing the root cause for side-channel leakage information. In standard CMOS style circuits the power consumption depends strongly on the processed data. In other logic styles, like sense amplifier based logic (SABL) [24], which is based on differential cascode voltage switching logic (DCVLS), the power consumption is data independent (if coupling effects are negligible). However in terms of area and power such circuit styles require more than twice as much area and power as unprotected CMOS circuits. Logic styles with a pre-charge and an evaluation phase are also basically two-cycle schemes in contrast to a standard CMOS design style, which allows an operation every clock cycle. It has also to be pointed out, that such design styles currently do not seem well suited to a semi-custom design flow, which is based on a high-level hardware description language and standard cell libraries. The wave dynamic differential logic style (WDDL) adopts the ideas of SABL, but is based on standard CMOS [25]. It overcomes the last problem, but at the costs of three times the area consumption and a two-cycle scheme.

The third class of measures counteracts DPA by randomizing intermediate results occurring during the execution of the cryptographic algorithm. The idea behind this approach is that the power consumption of operations on randomized data should not be correlated with the actual plain intermediate data. Algorithmic countermeasures in the context of symmetric ciphers based on secret sharing schemes have been independently proposed by Goubin and Paterin [11] and Chari et al. [5]. Approximately the same time masking at algorithm level for asymmetric ciphers has been developed [7, 18]. Messerges [16] introduced the idea of masking all data and intermediate values during an encryption operation. Akkar and Giraud [1] introduced masking methods for DES and AES with the fundamental contribution of a robust, albeit not perfect, masking for the non-linear parts. A suggested simplification proposed in [28] was recently found to be vulnerable to first order DPA attacks [2]. Cryptographic algorithms often combine Boolean functions (like logical XOR or AND operations) and arithmetic functions (operations in fields with characteristic bigger than two). Masking operations for these two types of functions are referred to as Boolean and arithmetic masking, respectively. This poses the problem of a secure conversion between the two types of masking in both directions [1]. It has also been noticed that the multiplicative masking in the AES leads to a problem with zero values, i.e. a zero byte will not get masked and will also be mapped to a zero byte by the S-box [10, 28]. The zero-value problem makes the original masked version of the AES vulnerable to DPA. As a consequence [26, 27] and [4] have proposed countermeasures, which would protect also against the zero-value problem.

Notably the latter three proposals apply masking no longer on the algorithm level, but at the level of logic gates. In an earlier work Messerges [17] already applied the idea of masking at the gate level and proposed to replace the multiplexer gate (MUX) used in the implementation of non-linear operations, like S-boxes, by a masked MUX gate (which in turn consists of three MUX gates). A theory of securing a circuit at the gate level against side-channel attacks (focused on probing) was developed in [12]. Masking at gate level leads to circuits where no wire carries a value, which is correlated to an intermediate result of the algorithm. Clearly this approach is more generic than the algorithmic approach. Masking at gate level is independent of the specific algorithm implemented. Once a secure masking scheme has been developed the generation of the masked circuit from the algorithm can be automated, and a computer program can convert the digital circuit of any cryptographic algorithm to a circuit of masked gates. This would also relief the authors or implementers of cryptographic algorithms from the complex task of elaborating a specific solution against side-channel leakage for each new implementation variant or algorithm. Various generic masking schemes have been proposed. These are either based on the MUX technique of [17], like [8, 9], or which use correction terms, e.g. for the AND gate [26]. The random switching logic (RSL) of [23] uses a random input per gate and introduces an enable signal, which forces the output to a definite value until all input signals are stable. Hence it is also a hidden two-cycle scheme, however, requiring a delicate adjustment of the timing of the enable signal.

In a recent publication Mangard, Popp, and Gammel [15] have shown that the security analyses of masking schemes that have been conducted so far were based on an implicit assumption, which does not hold in general: The input signals of almost any (masked) gate in a combinational CMOS circuit do not arrive at the same time. Therefore, the output of the gate possibly switches several times during one clock cycle. The transitions at the output of a gate, before the stable state right before the next clock edge is attained, are called glitches.

Glitches are a typical phenomenon in CMOS circuits and extensively discussed in the literature on VLSI design (see e.g. [21]). Because a glitch can cause a full swing transition at the output of the gate, just like the "proper" transition to the final value, a glitch is not a negligible higher order effect. As made evident in [15] glitches do not just add a background noise due to uncorrelated switching activity.

Unfortunately, the dissipated energy of non-linear masked gates is correlated to the processed values whenever the input values do not arrive simultaneously (forcing the output of the gate to toggle several times). Hence glitches carry side-channel information and must be considered properly in the analysis of any secure masking scheme.

SUMMARY OF THE INVENTION

It is an object of the present invention to provide a concept for calculating a result of a non-linear logical operation, which is flexible and efficient on the one hand and secure on the other hand.

In accordance with the first aspect of the present invention, this object is achieved by an apparatus for calculating a representation of a result operand of a non-linear logical operation between a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising: a first logic gate for calculating a fifth auxiliary operand based on at least two auxiliary operands, the at least two auxiliary operands including one of the first and second auxiliary operands and one of the third and fourth auxiliary operand; a second logic gate for calculating a sixth auxiliary operand based on the first to fourth auxiliary operands, wherein the first and second logic gates are designed such that the fifth and sixth auxiliary operands when linearly combined, result in the result operand, and wherein the first and second logic gates are designed such that an average energy consumption of the first or second logic gate is substantially equal to a plurality of combinations of auxiliary operands at the beginning of a first operation cycle and of auxiliary operands at the beginning of a second operation cycle, the average energy being derivable from a plurality of different orders of occurrences of the first to fourth auxiliary operands.

In accordance with a second aspect of the present invention, this object is achieved by a method of calculating a representation of a result operand of a non-linear logical operation between a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising the steps of: calculating a fifth auxiliary operand based on at least two auxiliary operands using a first logic gate, the at least two auxiliary operands including one of the first and second auxiliary operands and one of the third and fourth auxiliary operand; and calculating a sixth auxiliary operand based on the first to fourth auxiliary operands using a second logic gate, wherein the first and second logic gates are designed such that the fifth and sixth auxiliary operands when linearly combined, result in the result operand, and wherein the first and second logic gates are designed such that an average energy consumption of the first or second logic gate is substantially equal to a plurality of combinations of auxiliary operands at the beginning of the first operation cycle and of auxiliary operands at the beginning of a second operation cycle, the average energy being derivable from a plurality of different orders of occurrences of the first to fourth auxiliary operands.

BRIEF DESCRIPTION OF THE DRAWINGS

Preferred embodiments of the present invention are subsequently discussed with reference to the accompanying drawings, in which:

FIG. 1b is a schematic diagram of a concatenation of two devices from FIG. 1a;

FIG. 2a is a timing diagram showing some orders p of occurrences of the first to fourth auxiliary operands;

FIG. 2b is a time diagram of an output of the device in FIG. 1a showing several glitches depending on the order of occurrence of FIG. 2a over two operation cycles;

FIG. 2c is a table exemplarily illustrating a glitch situation in FIG. 2a and FIG. 2b;

FIG. 3 is a flow chart for illustrating the strategy behind an exhaustive search for finding the family of masked gates, which are theoretically secure also in the presence of glitches;

FIG. 4a is a table illustrating all Boolean functions of all locally G-equivariant gates;

FIGS. 4b and 4c are tables illustrating all Boolean functions of the additional semi-G-equivariant gates;

FIG. 5 is a table illustrating all possible combinations of first and second gates for implementing an AND operation in accordance with the preferred embodiment of the present invention;

FIG. 6 is a table illustrating all possible combinations of first and second gates for implementing an OR operation in accordance with the preferred embodiment of the present invention;

FIG. 7 a table illustrating all possible combinations of first and second gates for implementing an NAND operation in accordance with the preferred embodiment of the present invention;

FIG. 8 is a table illustrating all possible combinations of first and second gates for implementing an NOR operation in accordance with the preferred embodiment of the present invention;

FIG. 9a is one example of a logic implementation of the non-linear gate in FIG. 1a;

FIG. 9b is a general illustration of implementing the linear gate in FIG. 1a.

DETAILED DESCRIPTION OF PREFERRED EMBODIMENTS

Overview

Figure 1A:
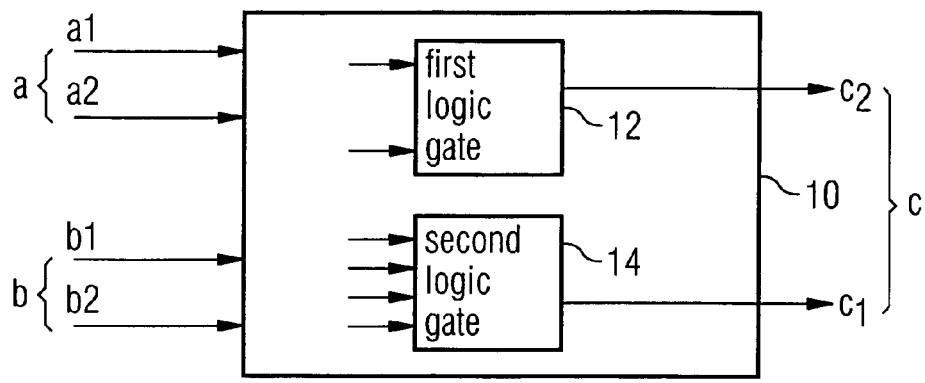
FIG. 1a is a schematic diagram of an apparatus for calculating in accordance with the present invention.

In accordance with the first aspect of the present invention, this object is achieved by an apparatus for calculating a representation of a result operand of a non-linear logical operation between a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising: a first logic gate for calculating a fifth auxiliary operand based on at least two auxiliary operands, the at least two auxiliary operands including one of the first and second auxiliary operands and one of the third and fourth auxiliary operand; a second logic gate for calculating a sixth auxiliary operand based on the first to fourth auxiliary operands, wherein the first and second logic gates are designed such that the fifth and sixth auxiliary operands when linearly combined, result in the result operand, and wherein the first and second logic gates are designed such that an average energy consumption of the first or second logic gate is substantially equal to a plurality of combinations of auxiliary operands at the beginning of a first operation cycle and of auxiliary operands at the beginning of a second operation cycle, the average energy being derivable from a plurality of different orders of occurrences of the first to fourth auxiliary operands.

In accordance with a second aspect of the present invention, this object is achieved by a method of calculating a representation of a result operand of a non-linear logical operation between a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising the steps of: calculating a fifth auxiliary operand based on at least two auxiliary operands using a first logic gate, the at least two auxiliary operands including one of the first and second auxiliary operands and one of the third and fourth auxiliary operand; and calculating a sixth auxiliary operand based on the first to fourth auxiliary operands using a second logic gate, wherein the first and second logic gates are designed such that the fifth and sixth auxiliary operands when linearly combined, result in the result operand, and wherein the first and second logic gates are designed such that an average energy consumption of the first or second logic gate is substantially equal to a plurality of combinations of auxiliary operands at the beginning of the first operation cycle and of auxiliary operands at the beginning of a second operation cycle, the average energy being derivable from a plurality of different orders of occurrences of the first to fourth auxiliary operands.

The present invention is based on the finding that DPA security can be achieved in the presence of glitches by calculating a representation of a result operand of a non-linear logical operation between a first operand and a second operand, when the first operand, the second operand, and the result operand are each represented by two auxiliary operands, which, when linearly combined, result in the respective operand. Additionally, for calculating the auxiliary operands representing the result operand, two logic gates are used. Each logic gate is designed such that the outputs of these logic gates, when linearly combined, result in the result operand.

Furthermore, the logic gates are designed such that an energy consumption of the logic gates is substantially equal to a plurality of combinations of auxiliary operands at a beginning of a first operation cycle and at a beginning of a second operation cycle, wherein the average energy is derived from a plurality of different orders of occurrences of the auxiliary operands representing the first and second operands at inputs of the first and second logic gates.

Preferably, the first logic gate is a linear gate, which only implements a logically linear operation such as an XOR or an XNOR operation.

Furthermore, the second logic gate is a non-linear logic gate, which includes non-linear operations such as an AND, OR, NAND, or an OR operation. Preferably, the second logic gate is implemented using AND combinations and XOR combinations.

Preferably, the logic gates are implemented on a transistor level using some transistors, which are part of the first logic gate and the second logic gate.

Furthermore, it is preferred to implement the two logic gates such that the pair of correlated signals such as the first and second auxiliary operands on the one hand and the third and fourth auxiliary operands on the other hand have always the same gate depth behind. This means that the first and second logic gates are implemented on the transistor level such that these pairs of auxiliary operands have the same gate delays, since they pass through the same gates.

Furthermore, it is preferred that the logic gates are implemented on transistor level such that the two correlated signals are routed whereby both signal paths have the same capacitances. Thus, the signal in each pair of correlated signals arrive simultaneously at an input of the respective next gate.

This implementation results in so-called semi-glitch equivariant gates, which can be used for implementing any non-linear logical operation between two microscopic operands.

It is to be pointed out that these semi-glitch-equivariant gates are DPA resistant in the presence of glitches for each and every circuit technology. Stated in other words, the logical function prescribed by these gates can be implemented by any circuit technology having any transition energy for an energy transition between zero and one, one and zero, zero and zero, or one and one.

Generally speaking, these preferred semi-glitch-equivariant gates guarantee DPA resistance in the presence of glitches irrespective of the actual values of their transition energies on the gate level.

When, however, certain less-general restrictions can be made, such as that the transition energy from zero to one is substantially equal to the transition energy from one to zero, or that the transition energy from zero to zero is substantially equal to the transition energy from one to one, the family of equivariant gates becomes larger.

For a fully flexible library-directed implementation, however, the fully general transition energy definition resulting in exactly eight logical gates as the non-linear gate in the pair of logic gates is preferably used.

In accordance with the present invention, a family of masked gates is found, which are theoretically secure also in the presence of glitches. These gates form a universal set and can be used under practically very controllable conditions in automated CMOS circuit synthesis and, in addition, in an automated circuit synthesis for other technologies, since the logic gates being used are designed such that an energy consumption of these gates is substantially equal to a plurality of combinations of auxiliary operands at the beginning of a first operation cycle and auxiliary operands at the beginning of a second operation cycle, wherein the average energy is derived from a plurality of different orders of occurrences of the first to fourth auxiliary operands.

Presentation and Analysis of the Glitch Problem

Before preferred embodiments of the present invention are discussed in detail, the problem of glitches will be formulated in an abstract way.

Subsequently, the model for the power consumption of CMOS gates is refined, taking into account the side-channel of glitches. Based on this model the notion of G-equivariance is introduced and it is shown that the stated gate and energy models having G-equivariance are preferred conditions for randomized gates to prevent a differential power attack. One can show that, unfortunately, in a class of gates, which is preferred for implementation reasons, there exists no G-equivariant gate that can be used to realize a non-linear logical function. However, for a preferred model with weakened conditions one is able to explicitly construct a universal set of semi-G-equivariant gates. The necessary constraints on gate design and signal routing are realizable in practice and can be fulfilled using available standard tools.

In this chapter the glitch problem found in [15] is reformulated in a more theoretical and abstract way. First, the abstraction of the energy consumption of a single gate, which is the target of a DPA attack, is recapitulated. The most simple energy model, which is commonly used, is mentioned and a more general definition is given. Then the basic attack on such a gate with statistical means is described. The definitions of randomized gates (in the classical meaning) is given and it is shown how a DPA may still be successful if the more general energy description is applicable.

The Simplistic Power Consumption Model of a Gate

A gate g with n inputs and one output will be interpreted as a function $g: F_2^n \to F_2$. In a synchronous design of a gate (within a circuit) at the beginning of a clock cycle, the old values persist for a very short time. After the clock edge the input values start to change and so does the output value, stabilizing at the end of the clock cycle. For power analysis one is interested in a relation between the logical values processed in this gate and the energy used by this procession. This is so since an attacker may not be able to measure a single digital value but rather the power consumption (current) of the gate during this transition. Usually, e.g. in CMOS, the digital values 0 and 1 are represented by two different voltage levels and the switch between these values needs most power while staying at the same level needs only a few amount.

If one assumes that an attacker may be able to measure the integral of the power needed by one gate during one clock cycle, the following definition of an energy function of a gate is obvious:

Definition 1. Let $g: F_2^n \to F_2$ be a gate. The input at time $t_0$, at or shortly before the rising edge of a clock cycle, is $a=(a_1, \ldots, a_n) \in F_2^n$ and the input at $t_1$, at or shortly before the next rising edge, is $x=(x_1, \ldots, x_n) \in F_2^n$. Then the energy consumption of the gate during this transition is given by the real number $E_g(a,x) \in R$. Hence the energy function of the gate g is the map $$E_g: F_2^n \times F_2^n \to R, (a,x) \mapsto E_g(a,x) \tag{1}$$

This definition is rather general. Note, that the energy function of a gate may be different for individual gates in some circuit, even if they are functionally equal.

In a simplistic energy consumption model one identifies the power consumption of a gate with the energy needed to drive the output capacitance if the output toggles. Hence, the power consumption of a gate (during one clock cycle) is described only by its digital output behaviour. Hence the Energy consumption is given by the output value of g at $t_0$ and $t_1$ and a tuple $(E_{g,0 \to 0}, E_{g,0 \to 1}, E_{g,1 \to 0}, E_{g,1 \to 1}) \in R^4$. If at $t_0$ the output value of g is 1 and at $t_1$ it is 0 then the energy for this clock cycle is $E_{g,1 \to 0}$. Hence in this model the energy function of the gate g is given by $$E_g(a,x) = E_{g,g(a) \to g(x)} \tag{2}$$

Differential Power Analysis on this Model

Assume a cryptographic algorithm with some secret (key) implemented as a CMOS circuit. Further assume there is a gate $g: F_2^2 \to F_2$ within this circuit. The input values of g at time $t_0$ are $(a,b) \in F_2^2$ and at a later time $t_1$ are $(x,y) \in F_2^2$. Since an attacker will survey the energy consumption of this gate during several runs of the algorithm with different messages, these values may be seen as random variables $a,b,x,y: \Omega \to F_2$ on some probability space $(\Omega, A, P)$. This gives rise to the following concatenation $$\epsilon_g := E_g \circ (a,b,x,y): \Omega \to F_2^2 \times F_2^2 \to R \tag{3}$$

With the knowledge of the secret key (or parts of it), which is called the hypothesis, one may construct a partition of $\Omega$ into two measurable disjoint subsets A and B such that $\Omega = A \cup B$ and $\emptyset = A \cap B$ with the property:

$$E(\epsilon_g|A) \neq E(\epsilon_g|B) \tag{4}$$

while this construction done with a wrong hypothesis yields:

$$E(\epsilon_g|A) = E(\epsilon_g|B) \tag{5}$$

One classical example, cf. [13], is the partition of $\Omega$ into $$A = \{\omega \in \Omega : g(x(\omega), y(\omega)) = 1\} \tag{6}$$

$$B = \{\omega \in \Omega : g(x(\omega), y(\omega)) = 0\} \tag{7}$$

With the simplistic energy model one obtains $$E(\epsilon_g|A) = \alpha E_{g,0 \to 1} + (1-\alpha) E_{g,1 \to 1} \tag{8}$$

$$E(\epsilon_g|B) = \beta E_{g,0 \to 0} + (1-\beta) E_{g,1 \to 0}$$

for $\alpha := P(\{\omega \in \Omega : g(a(\omega), b(\omega)) = 0\}|A)$ and $\beta := P(\{\omega \in \Omega : g(a(\omega), b(\omega)) = 0\}|B)$. In general these two expectation values are not equal (if the hypothesis was correct). This gives rise to the classical DPA.

Remark 1. It is clear that, if $E_{g,0 \to 0} = E_{g,0 \to 1} = E_{g,1 \to 0} = E_{g,1 \to 1}$ then indeed the two expectation values are always equal, independent if the hypothesis was right or wrong. Hence no DPA is possible. In general terms, if the energy function $$E_g: F_2^2 \times F_2^2 \to F_2 \text{ is constant}(*) \tag{9}$$

then this gate does not leak information and a DPA on this gate is not possible.

In practice these conditions are only met if a logic style is chosen for the implementation, which guarantees the constantness of the energy, function itself. This corresponds to the second class of approaches of the introduction (e.g. DCVSL or SABL) and consequently leads to the mentioned disadvantages.

If this is not applicable, one still may be able to use the additional conditions given by a,b,x,y: One only has to fulfil the condition $$\epsilon_g: \Omega \to R \text{ is constant}(**) \tag{10}$$

which is a weaker condition as the former one. However, if one wants to find gates for general purpose one has to fulfil this condition (**) for any a,b,x,y. But, unfortunately, this is equivalent to the condition (*) in the simplistic power model.

Randomized Logic

In fact, there still may be the possibility that $\epsilon_g$ is constant even if $E_g$ is not constant. This can be the case, if the variables a,b,x,y obey certain restrictions. Usually, restrictions of this kind—with only two inputs—cannot be fulfilled if the gate is doing something useful. But it may be possible in the class of randomized (masked) gates, which will be discussed now.

Randomizing a signal (in our context) means substituting one digital signal $a \in F_2$ by a number of signals $a_1, \ldots, a_n \in F_2$ with $a = a_1 + \ldots + a_n$ in a way that there exists no correlation between a and each $a_i$. In a practical application, only in very few cases one has the resources to choose n>2. Hence the discussion will be restricted to the case n=2 throughout this paper.

One philosophy is to interpret the randomized signal $(a_1, a_2)$ as the pair of the masked signal $a_m = a_1$ and its mask $m_a = a_2$ (cf. notation in e.g. [15]). But this is only terminology and one will only follow it in our discussion for presenting the randomized gates as in [15]. However this point of view has an impact on the philosophy on randomized (or masked) gates: Since the signals a,b are now split up in two portions one has to substitute the old gate g: $F_2^2 \to F_2$ by a new gate.

The first choice would be g': $F_2^2 \times F_2^2 \to F_2$ such that $g(a,b) = g'(a_1,a_2,b_1,b_2)$, with $a = a_1 + a_2$ and $b = b_1 + b_2$. But since the output should also be randomized one possibility would be g': $F_2^2 \times F_2^2 \times F_2 \to F_2$, with the property $g(a,b) = g'(a_m, m_a, b_m, m_b, m_c) + m_c$ with $a = a_m + m_a$ and $b = b_m + m_b$. This property defines g' uniquely. In the following g' is called the masked lifting of g, since the output of g' is the output of $c := g(a,b)$ masked with $m_c$. FIG. 1 shows an example for a circuit using masked liftings of gates (left sketch) and a realization of a lifting on an AND gate [26, 9] (right sketch).

Another choice is using two gates $(g_1, g_2)$: $F_2^2 \times F_2^2 \to F_2^2$ with the property $g(a,b) = g_1(a_1,a_2,b_1,b_2) + g_2(a_1,a_2,b_1,b_2)$. Here $g_1$ and $g_2$ are not uniquely defined by this property. But of course if $g_1$ is given, then $g_2$ is fixed. The pair $(g_1, g_2)$ is called a randomized lifting of g.

Using the energy consumption model from above, i.e.

$$E_{g'}((\tilde{a},\tilde{b},m_c),(\tilde{x},\tilde{y},m_z)) = E_{g',g'(\tilde{a},\tilde{b},m_c) \to g'(x,y,m_z)} \tag{11}$$

where $(\tilde{a},\tilde{b},m_c) \in F_2^2 \times F_2^2 \times F_2$ is the input at $t_0$, $(\tilde{x},\tilde{y},m_z) \in F_2^2 \times F_2^2 \times F_2$ the input at $t_1$ with the abbreviations $\tilde{a} = (a_m, m_a)$ etc., the energy consumption $E_g((a,b),(x,y))$ has to be substituted by the expectation value $$E(E_{g'}((\tilde{a},\tilde{b},m_c),(\tilde{x},\tilde{y},m_z))) \tag{12}$$

where $\tilde{a} = (a_m, m_a)$, $\tilde{b} = (b_m, m_b)$, $m_c$, $\tilde{x} = (x_m, m_x)$, $\tilde{y} = (y_m, m_y)$, $m_z$ are interpreted as random variables with $a = a_m + m_a$ etc. An attacker will not be able to know or force the exact (microscopic) signals $(\tilde{a},\tilde{b},m_c)$, $(\tilde{x},\tilde{y},m_z)$ but rather only the (macroscopic) signals a,b,x,y. It was object of [26, 9, 15]. Indeed, if $m_c, m_z: \Omega \to F_2$ are uniformly distributed random variables, independent to the random variables $g(a,b), g(x,y)$ then the masked lifting g of a gate g does not leak information, i.e., $E(E_{g'}((\tilde{a},\tilde{b},m_c),(\tilde{x},\tilde{y},m_z)))$ is independent of a,b,x,y.

Power Consumption of a Gate in the Presence of Glitches

Before it has been shown that there are gates g': $F_2^2 \times F_2^2 \times F_2 \to F_2$, such that for any signals (random variables) $a_m, m_a, b_m, m_b, m_c: \Omega \to F_2$ and $x_m, m_x, y_m, m_y, m_z: \Omega \to F_2$ the expectation value $E(E_{g'}((\tilde{a},\tilde{b},m_c),(\tilde{x},\tilde{y},m_z)))$ is independent of the signals, i.e. a constant, as long as some signals have certain independence and distribution properties.

As realized in [15] in real CMOS implementations the different signals $x_m, m_x, y_m, m_y, m_z$ may not arrive at the gate at the same time.

In the example circuit of FIG. 1 signal dm arrives with a delay at the input of gate g'$_2$ compared to signals $m_d, c_m, m_c$ due to the gate delay of g'$_1$. Furthermore, all input signals of gate g'2 have in general different additional delay contributions due to the propagation delay from wire capacitances. These delays are fixed when the circuit is layout and depend on the route of the signal.

Consider the example that the signals arrive in the distinct order $y_m \to m_y \to m_z \to x_m \to m_x$. In this case the output value of the gate changes not only once during the clock cycle but five times leading to the consecutive output transitions $$g(a_m,m_a,b_m,m_b,m_c) \to g(a_m,m_a,y_m,m_b,m_c) \to g(a_m,m_a, y_m,m_y,m_c) \to g(a_m,m_a,y_m,m_y,m_z) \to g(x_m,m_a,y_m, m_y,m_z) \to g(x_m,m_x,y_m,m_y,m_z) \tag{13}$$

Therefore the energy consumption will be in fact the total of $$E_{g' \cdot g(a_m,m_a,b_m,m_b,m_c) \to g(a_m,m_a,y_m,m_b,m_c)} + \\ E_{g' \cdot g(a_m,m_a,y_m,m_b,m_c) \to g(a_m,m_a,y_m,m_y,m_c)} + \\ E_{g' \cdot g(a_m,m_a,y_m,m_y,m_c) \to g(a_m,m_a,y_m,m_y,m_z)} + \\ E_{g' \cdot g(a_m,m_a,y_m,m_y,m_z) \to g(x_m,m_a,y_m,m_y,m_z)} + \\ E_{g' \cdot g(a_m,m_a,y_m,m_y,m_z) \to g(x_m,m_x,y_m,m_y,m_z)} \tag{14}$$

Hence a new power model is required such that $E_{g'}((\tilde{a}, \tilde{b}, m_c), (\tilde{x}, \tilde{y}, m_z))$ is given by the sum from above. Unfortunately, with this model, the authors of [15] have shown that $E(E_{g'}((\tilde{a},\tilde{b},m_c),(\tilde{x},\tilde{y},m_z)))$ is not independent of a,b,x,y any more. The masked lifting of non-linear gates like AND, OR have this unfortunate property, while the masked lifting of the linear gate XOR has a constant expectation value. Hence there is no universal set of gates in the masked liftings of gates (with n=2).

One can conceive an even worse situation: if a well-equipped attacker is able to measure the different partial energies of the five transitions the constraints for a gate to be resistant against DPA are even more difficult to fulfil. Below, a higher dimensional power model is introduced which is capable to describe this situation.

The masked lifting of gate g has the disadvantage that it has to be a lifting of a normal single gate g. The second approach of using a randomized lifting $(g_1, g_2)$ is more flexible, since two gates $(g_1$ and g) together have to realize the normal gate g.

This is the strategy followed in the next chapters. The space of randomized gates of the form $g_i$: $F_2^2 \times F_2^2 \to F_2$ will be explored to find gates, which are "secure" in the presence of glitches. The notion of "secure" will be defined precisely. Later on the found gates can be combined to realize logical functions like randomized AND or OR gates.

Mathematical Abstraction of the Problem

The last chapter may have motivated the following strategy and definitions. First the abstract model of the gates together with their energy model will be defined. Finally the conditions imposed on the gates will be formulated, which ensure that a differential power attack cannot be mounted.

The Gate Model

Definition 2. A gate g with n inputs is a function g: $F_2^n \to F_2$. The transition function $\hat{g}$ of g is the map $$\hat{g}: F_2^n \times F_2^n \times \text{Map}(\{1,\ldots,n\},\{1,\ldots,n,\}) \to F_2^{n+1}(\tilde{a}, \tilde{x},\phi) \mapsto (g(\tilde{b}_1),\ldots,g(\tilde{b}_{n+1})) \tag{15}$$

where $\tilde{b}_1 = (b_{i1},\ldots,b_{in}) \in F_2^n$ is defined by:

$$b_{ij} := \begin{cases} a_j, & \text{if } \varphi(j) \geq i \\ x_j, & \text{if } \varphi(j) < i \end{cases} \tag{16}$$

in particular $\tilde{a} = \tilde{b}_1$ and $\tilde{x} = \tilde{b}_{n+1}$.

The transition function $\hat{g}$ describes the n+1 values, the output of the gate has if the n input signals arrive at n possible different moments in time. This means, if $f\phi(j)=1$ then signal j changes first and the signal to change next is the one with $\phi(j)=2$, and so on. Since two or more signals may arrive at the same time the map $\phi$ does not need to be a permutation. The old energy description of a gate can be obtained by fixing $\phi \equiv 1$ (or any constant between 1 and n).

Remark 2. The order of the signals $\phi$. is a constant associated for each single gate within a circuit. This order is fixed at the design time of the circuit and is given by the depth of logic tree at each input of the gate and the precise route of the signals. Both factors determine the arrival times of the input signals.

The Energy Consumption of a Gate in this Model

Because the gate g can switch up to n times within one clock period and because every toggle of the output consumes the power $E_{g,0\_0}=E_{g,0\_1}=E_{g,0\_0}=E_{g,1\_1}$ the notion of the energy function hast to be generalized. Also, since the four values from above may strongly depend on the individual gate and its position in a circuit, it makes sense to treat these values as indeterminants. Therefore it is natural to value the energy function not in R but rather in the 4-dimensional vector space $$V := R \cdot e_{00} \otimes R \cdot e_{01} \otimes R \cdot e_{10} \otimes R \cdot e_{11}.$$

For a certain implementation one may concatenate the energy function with the evaluation function ev:

$$V \to R, (x_{00}, x_{01}, x_{10}, x_{11}) \mapsto \Sigma_{ij} x_{ij} E_{g, i \to j}.$$

Definition 3. The partial (or local) energy functions of a gate g: $F_2^n \to F_2$ are given by $$E_{g,i}: F_2^n \times F_2^n \times \text{Map}(\{1, \ldots, n\}, \{1, \ldots, n,\}) \to V (\tilde{a}, \tilde{x}, \phi) \mapsto e_{g(b_i), g(b_{i+1})} \quad (17)$$

for i=1, ..., n and $\tilde{b}_1$ as described in the last definition. The total (or global) energy function $E_g$ of a gate g: $F_2^n \to F_2$ is the sum of its partial energy functions:

$$E_g := E_{g,1} + \ldots + E_{g,n} \quad (18)$$

Remark 3. This definition of the energy consumption of a gate reflects the assumption that the implementation of such a gate does not have any usable internal side channels. This means, for instance, that the gate itself is inherently glitch free and there is only one signal change at the output if one input signal changes. Also the output delay must not depend on the input value. It can safely be assumed that these prerequisite can be realized in practice if a masked logic cell is crafted for use in a library.

Randomized Signal Pairs

Randomization in our context means splitting up a signal a into a pair $(a_1, a_2)$ of signals such that $a=a_1+a_2$ and the individual bits $a_1$ and $a_2$ are unknown, i.e., random and uniformly distributed. Since one is, first of all, interested in the randomized realization of (macroscopic) 2-1 gates like AND, OR, etc. one can restrict the possible gates to gates with two (macroscopic) inputs, a,b, hence four actual inputs $a_1, a_2, b_1, b_2$. FIG. 1$b$ depicts a combinational circuit where two normal gates $g_1(a,b)$ and $g_2(d,c)$ have been replaced by two randomized liftings of gates $(g11(a_1,a_2,b_1,b_2), g12(a_1,a_2,b_1,b_2))$ and $(g21(d_1,d_2,c_1,c_2), g22(d_1,d_2,c_1,c_2))$ which sustain the old functionality of the circuit. The following two definitions describe this situation:

Definition 4. A randomized signal pair (RSP) is a 4-tuple $(a_1, a_2, b_1, b_2)$ of random variables $a_1, a_2, b_1, b_2: \Omega \to F_2$ such that the following properties are fulfilled:

1. $a_1, a_2, b_1, b_2$ are uniformly distributed, e.g., $P(a_1=0)=P(a_1=0)=\frac{1}{2}$.

2. The pair of variables $a_i, b_j$ is independent, for all i,j=1,2.

Remark 4. The pairs $a_1, a_2$ and $b_1, b_2$ may not be independent!

Definition 5. If one defines $a := a_1+a_2: \Omega \to F_2$ and $b := b_1+b_2: \Omega \to F_2$ then (a,b): $\Omega \to F_2^2$ is a pair of random variables and one says $(\tilde{a}, \tilde{b})$ is a lifting of the pair (a, b), where $\tilde{a} := (a_1, a_2)$ and $\tilde{b} := (b_1, b_2)$ In the following it is not intended try to find a single gate g' which exactly lifts the functionality of the old gate g. Instead it is intended to follow the general strategy to search for a universal set of lifted gates. That is a family of gates, which have the property that the energy of the macroscopic transition (a,b) (x,y) does not leak information and which can be combined to realize any logical function.

Subsequently, a precise formulation of the necessary conditions for lifted gates will be given, which do not leak information also in the presence of glitches.

The Criterion of Glitch-Equivariance of Gates

The notion of glitch-equivariant gates is now introduced. Gates satisfying the criterion of glitch-equivariance do not leak information about the macroscopic transition (a,b)→(x, y), because they have no flaw in the side-channel of glitches.

Based on the model for the energy function of a masked CMOS gate, Definition 3, and the notion of a randomized signal pair, Definition 4, the following definitions describe necessary conditions for the resistance of masked gates in a DPA attack in the presence of glitches.

Definition 6. A gate g: $F_2^2 \times F_2^2 \to F_2$ is called globally G-equivariant if for any $\phi \in \text{Map}(\{1, \ldots, 4\}, \{1, \ldots, 4\})$ the expectation value of the total energy $$E(E_g((\tilde{a}, \tilde{b}), (\tilde{x}, \tilde{y}), \phi)) \in V \quad (19)$$

is independent of any choice of randomized signal pairs $(\tilde{a}, \tilde{b}), (\tilde{x}, \tilde{y})$.

A gate g: $F_2^2 \times F_2^2 \to F_2$ is called locally G-equivariant if for any $\phi \in \text{Map}(\{1, \ldots, 4\}, \{1, \ldots, 4\})$ and i=1, 2, 3, 4, the expectation values of the partial energies $$E(E_{g,i}((\tilde{a}, \tilde{b}), (\tilde{x}, \tilde{y}), \phi)) \in V \quad (20)$$

are independent of any choice of randomized signal pairs $(\tilde{a}, \tilde{b}), (\tilde{x}, \tilde{y})$.

Remark 5. Obviously every locally G-equivariant gate is also globally G-equivariant.

Since the family of the randomized signal pairs $(\tilde{a}, \tilde{b}), (\tilde{x}, \tilde{y})$ can be very large one needs a simpler criterion in order to decide if a gate is G-equivariant. The first lemma reduces the criterion to certain randomized signal pairs.

Lemma 1. A gate g: $F_2^2 \times F_2^2 \to F_2$ is globally G-equivariant if and only if for any $\phi$ the value $E(E_g((\tilde{a}, \tilde{b}), (\tilde{x}, \tilde{y}), \phi)) \in V$ is independent of any choice of randomized signal pairs $(\tilde{a}, \tilde{b}), (\tilde{x}, \tilde{y})$ which are liftings of constant pairs (a,b),(x,y).

A gate g: $F_2^2 \times F_2^2 \to F_2$ is locally G-equivariant if and only if for any $\phi$ and i the value $E(E_{g,i}((\tilde{a}, \tilde{b}), (\tilde{x}, \tilde{y}), \phi)) \in V$ is independent of any choice of randomized signal pairs $(\tilde{a}, \tilde{b}), (\tilde{x}, \tilde{y})$ which are liftings of constant pairs (a,b),(x,y).

The next lemma reduces the criterion to one, which is directly computable.

Lemma 2. A gate g: $F_2^2 \times F_2^2 \to F_2$ is globally G-equivariant if and only if for any $\phi$ the $2^4$ values $$\sum_{\substack{a_1+a_2=a \\ b_1+b_2=b \\ x_1+x_2=x \\ y_1+y_2=y}} E_g((a_1,a_2,b_1,b_2),(x_1,x_2,y_1y_2),\varphi), \quad (21)$$

for $a, b, x, y \in F_2$ are equal. A gate $g: F_2^2 \times F_2^2 \to F_2$ is locally G-equivariant if and only if for any $\phi$ and $i=1, 2, 3, 4$, the $2^4$ values $$\sum_{\substack{a_1+a_2=a \\ b_1+b_2=b \\ x_1+x_2=x \\ y_1+y_2=y}} E_{g,i}((a_1,a_2,b_1,b_2),(x_1,x_2,y_1,y_2),\varphi), \quad (22)$$

for $a, b, x, y \in F_2$ are equal.

From the definition of G-equivariances it is immediately obvious that gates satisfying this criterion overcome the problem of side-channel leakage by glitches (at least the dominant effect which is captured by the defined model). It is a simple task to perform an exhaustive search on all $2^{16}$ possible gates $g: F_2^2 \times F_2^2 \to F_2$ using Lemma 2 to obtain a complete list of all locally and globally G-equivariant gates.

There are 50 globally and locally G-equivariant gates. In Tab. 1 (FIG. 4a) the algebraic normal forms of all 50 locally G-equivariant gates are given. The constant c can take the values $\{0,1\}$.

$$\begin{array}{|c|}\hline c+a_1+b_1 \\ c+a_1+b_2 \\ c+a_2+b_1 \\ c+a_2+b_2 \\\hline\end{array} \begin{array}{|c|}\hline c+a_1 \\ c+a_2 \\ c+b_1 \\ c+b_2 \\\hline\end{array} \begin{array}{|ccccc|}\hline c, & c+a_1b_1 & c+a_1+a_1b_1, & c+b_1+a_1b_1, & c+a_1+b_1+a_1b_1 \\ & c+a_1b_2, & c+a_1+a_1b_2, & c+b_1+a_2b_1, & c+a_1+b_2+a_1b_2 \\ & c+a_2b_1, & c+a_2+a_2b_1, & c+b_2+a_1b_2, & c+a_2+b_1+a_2b_1 \\ & c+a_2b_2 & c+a_2+a_2b_2, & c+b_2+a_2b_2, & c+a_2+b_2+a_2b_2 \\\hline\end{array} \quad (23)$$

Some cryptographic properties of these Boolean functions will be mentioned below. The definitions of properties are well known and can be found e.g. in [20]. The first group of 8 functions is balanced and first order correlation immune, i.e. CI(1), but doesn't satisfy the propagation criterion (PC) to any degree. The second group of 8 functions is balanced and neither correlation immune nor satisfying PC. The remaining 34 functions are neither balanced nor CI nor satisfying PC.

Unfortunately, neither in the set of globally nor locally G-equivariant gates there are two gates, which can be paired to a lifting of any non-linear gate (like AND or OR). Thus it has been shown that:

Theorem 1. There is no universal set of masked gates of the form $F_2^2 \times F_2^2 \to F_2$ satisfying the G-equivariance criterion.

The Logic Family of Semi-G-Equivariant Gates

The results from the last chapter lead to the question, whether the strong condition of G-equivariance can be mediated for the realization of a masked CMOS circuit in practice.

Consider the replacement of all simple gates $g_i$ with input $a_i, b_i$ and output $c_i$ by gates $\tilde{g}_i$ with input $\tilde{a}_i=(a_{i1},a_{i2})$, $\tilde{b}_i=(b_{i1},b_{i2})$ and output $\tilde{c}_i=(c_{i1},c_{i2})$. It is obvious that the pair of correlated signals (say $a_{i1},a_{i2}$) of a macroscopic signal ($a_i$) have always the same gate depth behind, since they always pass through the same gates. The requirement for the implementation of a masked gate $g_i$, that the gate delay for both outputs, ($c_{i1},c_{i2}$), must be identical, can be fulfilled in practice with minor efforts. Under this condition the cumulative gate delay for each signal of a pair of correlated signal is equal. The remaining source for different propagation times of the two correlated signals are different routes with different capacitances. With today's routing technology, however, it is possible to control routing in a way that both signals paths have the same capacitances. If these design and routing constraints are met each pair of correlated signals arrives simultaneously at the input gate of the next gate. This practically realizable set-up for a CMOS circuit implementation rules out certain combinations in the order of Specifically, the conditions in Definition 2 can be reduced to all maps $\phi$ with $\phi$ (1)=$\phi$ (2) (for $a_1,a_2$) and $\phi$ (3)=$\phi$ (4) (for $b_1,b_2$).

Definition 7. A gate $g: F_2^2 \times F_2^2 \to F_2$ is called globally semi-G-equivariant if for any $\phi \in \text{Map}(\{1,\ldots,4\},\{1,\ldots,4\})$ with $\phi$ (1)=$\phi$ (2) and $\phi$ (3)=$\phi$ (4) the expectation value of the total energy $$E(E_g((\tilde{a},\tilde{b}),(\tilde{x},\tilde{y}),\phi)) \in V \quad (24)$$

is independent of any choice of randomized signal pairs ($\tilde{a}$, $\tilde{b}$),($\tilde{x},\tilde{y}$).

A gate $g: F_2^2 \times F_2^2 \to F_2$ is called locally semi-G-equivariant if for any $\phi \in \text{Map}(\{1,\ldots,4\},\{1,\ldots,4\})$ with $\phi$ (1)=$\phi$ (2) and $\phi$ (3)=$\phi$ (4) the expectation value of the partial energies are independent of any choice of randomized signal pairs $$E(E_{g,i}((\tilde{a},\tilde{b}),(\tilde{x},\tilde{y}),\phi)) \in V \quad (25)$$

are independent of any choice of randomized signal pairs ($\tilde{a}$, $\tilde{b}$),($\tilde{x},\tilde{y}$).

Again a full search on all $2^{16}$ gates yields a list of gates. There are 58 globally semi-G-equivariant gates. All of these are also locally semi-G-equivariant. Hence for semi-G-equivariance the attributes 'local' and 'global' can be omitted. The list of 58 gates comprises the 50 gates from Tab. 1 and additionally the 8 gates given in Tab. 2 (FIG. 4b) below.

$$\begin{array}{|c|}\hline c+a_1+b_1+a_1b_1+a_1b_2+a_2b_1+a_2b_2 \\ c+a_1+b_2+a_1b_1+a_1b_2+a_2b_1+a_2b_2 \\ c+a_2+b_1+a_1b_1+a_1b_2+a_2b_1+a_2b_2 \\ c+a_2+b_2+a_1b_1+a_1b_2+a_2b_1+a_2b_2 \\\hline\end{array} \quad (26)$$

These 8 gates have the common properties of being balanced, first order correlation immune, i.e. CI(1), and satisfying the propagation criterion of degree 1, i.e. PC(1).

The 8 additional semi-G-equivariant gates now allow pairings to liftings of non-linear gates. A semi-G-equivariant AND gate can be realized, for instance, by the lifting $$\text{AND}(a_1,a_2,b_1,b_2)=(a_1+b_1,a_1+b_1+a_1b_1+a_1b_2+a_2b_1+a_2b_2) \quad (27)$$

using the first entries of Tab. 1 and Tab. 2. Accordingly all other commonly required non-linear gates can be derived. Thus, having found a universal set of gates it is possible to implement any algorithm.

CONCLUSIONS

A new energy model for CMOS gates was developed, which provides an abstract description of the behaviour of CMOS gates in realistic circuits. Specifically this model is able to capture the presence of glitches. Glitches have recently been identified as a side channel, which can be exploited in differential power, attacks. Based on this model, the notion of G-equivariant and semi-G-equivariant gates has been introduced. It has been shown that within the defined gate and energy models G-equivariance is a necessary condition on randomized gates (in an otherwise unconstrained CMOS circuit) to withstand a differential power attack. Unfortunately in the class of gates with only four inputs (which is preferred for implementation) there is no pair of gates, which realize a lifting of any non-linear gate. Hence, it has been shown that there exists no universal set of G-equivariant gates in this class of randomized gates. However, adopting a weakened model, which puts some constraints on the routing in a CMOS circuit, there are randomized gates, which can be used to design a DPA secure circuit. A universal set of semi-G-equivariant gates has been constructed. The constraints on gate design and signal routing are realizable in practice and can be done using available standard tools. The significant advantage of the proposed solution is that the gates can be implemented in standard CMOS style. It is certainly important to assure that masked semi-G-equivariant gates are carefully implemented avoiding leakage already from the internal nodes. The semi-G-equivariant gates still allow the implementation of a single-cycle clocking scheme, whereas circuit styles with pre-charge and evaluation phase intrinsically are two-cycle schemes.

One can conclude that cryptographic circuits using randomized gates satisfying the criterion of semi-G-equivariance should be safer against power attacks than those using conventional masking schemes unaware of glitches.

It is to be noted that the model developed in this paper is inevitably a coarse abstraction of the complicated physical processes of the energy dissipation in a switching CMOS circuit. Next-higher order effects may be related to the transient of the switching of a CMOS gate. Such effects may include partial swings of the outputs of gates (if glitches overlap) or cross-couplings between neighbouring wires, which lead to mutual information leakage. Such higher-order effects, however, are not specific to CMOS circuits, but affect also other circuit styles, which are theoretically resistant against DPA, such as dual-rail styles with precharge and evaluation phase. Nevertheless it is hoped that the next-higher order effects in the energy dissipation are connected with considerably less leakage information, thus pushing the efforts for a successful DPA to heights.

Currently it is not known if there exist liftings of non-linear gates, which satisfy the criterion of G-equivariance (not only semi-G-equivariance) if more than two randomized shares per input signal are admitted, or if there are more than two input signals, i.e. gates of the form g: $F_2^{n_1} \times \ldots \times F_2^{n_i} \to F_2$ ($n_i > 2, i \geq 2$).

FIG. 1$a$ illustrates an apparatus for calculating a representation of a result operand of a non-linear logical operation between a first operand and a second operand. The apparatus is indicated generally by the reference number 10. In particular, it is defined that the first operand is represented by a first auxiliary operand and a second auxiliary operand, the first and the second auxiliary operands resulting in the first operand and when combined using a linear combination. Such a linear combination can be an XOR, an XNOR, or any other linear combination.

The second operand is also represented by a third auxiliary operand and a fourth auxiliary operand, wherein the third and fourth auxiliary operands result in the second operand, when combined using a linear combination such as XOR, XNOR, or any other linear combination. In the embodiment in FIG. 1$a$, the first auxiliary operand is indicated by a1, the second auxiliary operand is indicated by a2, the third auxiliary operand is indicated by b1, and the fourth auxiliary operand is indicated by $b_2$. Furthermore, the first operand is indicated by a, the second operand is indicated by b, and the result operand is indicated by c.

The device in FIG. 1$a$ includes a first logic gate 12 for calculating a fifth auxiliary operand c1 based on at least two auxiliary operands. The at least two auxiliary operands include one auxiliary operand from the first and second auxiliary operands and one auxiliary operand from the third and fourth auxiliary operands. Thus, the first logic gate receives, as an input, a1 and b1, or a2 and b1, or a1 and b2, or a2 and b2.

The second logic gate 14, however, receives all auxiliary operands a1, a2, b1, b2, at its input.

The first and second logic gates 12, 14, are designed such that the fifth and the sixth auxiliary operands, i.e., c1, c2 result, when linearly combined, in the result operand c. Again, the combination rule for linearly combining the fifth auxiliary operand and the sixth auxiliary operand may be an XOR, XNOR, or any other linear combination.

In accordance with the present invention, the first and second logic gates 12, 14, are designed such that an average energy consumption of these logic gates 12, 14 is substantially equal to a plurality of combinations of auxiliary operands at the beginning of a first operation cycle and of auxiliary operands at the beginning of a second operation cycle, wherein the average energy being derivable from a plurality of different orders of occurrences of the first to fourth auxiliary operands.

To this end, reference is made to FIG. 2$a$. FIG. 2$a$ shows a time diagram of the input-side of any logic gate. In particular, FIG. 2$a$ shows an i-th operation cycle followed by an (i+1)-th operation cycle. In the first operation cycle in FIG. 2$a$, the order of occurrence of the auxiliary operands is a2, a1, b1, b2. In the next operation cycle, the order of occurrence of the auxiliary operand is different from before. Particularly, the order of occurrence is b1, a2, b2, and a1.

Now, the output situation of this gate in FIG. 2$b$ is given. The output of the gate can be calculated using the logic rule underlying the gate or a certain truth table, which is defined for the gate. For exemplary reasons, a truth table is assumed, which results in the glitches as defined in FIG. 2$b$. When the second auxiliary operand $a_2$ arrives at the input of the gate, a first glitch of the gate output occurs as indicated by '1' in FIG. 2$b$. When the second auxiliary operand $a_1$ arrives, no change of state takes place as indicated by '2' in FIG. 2$d$. Then, when the third auxiliary operand $b_1$ arrives at the input, a further glitch '3' takes place so that the gate output returns back to a positive value. Then, when the fourth auxiliary operand $b_2$ arrives at the input of the gate, no further output change takes place as indicated at '4' in FIG. 2$b$. The energy consumption of these events 1, 2, and 4 are shown in the left half of the table in FIG. 2$c$. One, in general, can observe four glitches at '1', '2', '3', and '4'. The final output value of the gate is the value at the gate output after the last glitch '4'.

Then, a next operation cycle starts. Again, four auxiliary operands arrive in a certain orders φ. The arrival of auxiliary operand b1 results in a first glitch at '5' in FIG. 2b. The arrival of auxiliary operand a2 arrives in a further glitch at '6'. The arrival of the next auxiliary operand b2 results in a further glitch at '7', while the arrival of the last auxiliary operand a1 does not result in any other change of state of the gate output.

The energy consumption of the gate during the glitches '5'-'8' is indicated at the right-hand side of FIG. 2c. It is to be noted here that the energy consumption values $E_{g10}$, $E_{g00}$, $E_{g01}$, and $E_{g11}$ will have certain values for certain circuit technologies. Nevertheless, such actual values are not necessary for finding the inventive DPA-secure logic gates.

In the following, reference is made to FIG. 3 to show how the exhaustive search, which has been discussed above, can be performed.

As shown at 30, one starts with selecting one gate of $2^{16}$ possible gates, which can be used for combining four auxiliary operands $a_1$, $a_2$, $b_1$, $b_2$.

Then, one certain combination of auxiliary operands at the beginning of a first operation cycle and at the beginning of a second operation cycle is selected. Then, as indicated by 32 in FIG. 3, the energy consumption, i.e., the glitches for this particular combination of auxiliary operands at the beginning of the first and second operation cycles are determined using the gate combination rule selected at step 30. Additionally, the glitches are determined for each and every possible constellation φ, i.e., for each and every possible order of the auxiliary operands. Importantly, the different constellations of the operands are not only restricted to all possible permutations of the auxiliary operands at the two operation cycles, but also include the case, when all auxiliary operands or a sub-group of auxiliary operands arrive at the input of the gate concurrently, i.e., at the same time instant.

The step 32 results in a glitch representation for each constellation of the occurrence of a certain auxiliary operand combination at the first and second operation cycles. Then, a global energy measure as determined by equation 21 above is determined. Referring to FIG. 2c, this means that all energy parameters $E_{gij}$ are summed-up to result in a total energy value for one constellation of occurrence. Then, the total values of all different constellations are summed-up to result in the value determined by equation 21. This value is the global energy measure. When this value is divided by the number of the possible constellations, the average energy consumption is obtained. Thus, the global energy measure as determined by step 34 is derived for one gate selected at step 30, and for one combination of auxiliary parameters and for a certain combination of auxiliary parameters at the beginning of the first and second operating cycle.

Alternatively, or additionally, step 34 also results in a local energy measure, when the summing-up of the energies is not performed per complete cycle but per glitch individually. The local energy measure is derived as shown in equation 22. In this case, one obtains one local energy per glitch, i.e., four values in this example.

Then, in step 36, the procedure of steps 32 and 34 is repeated for all different combinations for the gate selected in step 30.

Furthermore, the procedures in steps 32, 34, and 36 are performed for each other gate of the $2^{16}$ possible gates so that, after step 36, one has a global energy measure for each combination of auxiliary operands and for each gate. Then, in step 38, the energy measures for each gate are compared to each other. When the energy measures for each combination of auxiliary operands are substantially equal to each other, then this gate does not have any side channel in the presence of glitches. When, however, one finds out that the energy measure for a certain combination of auxiliary operands is different from an energy measure for a different combination of auxiliary operands, it has been found out that this particular gate has, indeed, a side channel, which could be used for a differential power analysis attack.

Naturally, one could perform step 38 not only for the global energy measures but also for the local energy measures. When step 38 is performed for each gate, one receives, at an output, the gates determined by the logical functions of FIGS. 4a and 4b.

It is to be noted here that the logical gates defined by FIGS. 4a and 4b are DPA-secure in the presence of glitches irrespective of the certain values of the transition energies $E_{gij}$ (i,j can be 0 or 1).

When, however, a certain circuit technology is at hand, in which further dependencies between the values $E_{gij}$ can be given such as the transition energy from 1 to 0 and vice versa are equal to each other, or that the transition energies between 0 and 0 or 1 and 1 are equal to each other, the number of DPA-secure logic gates is even larger than given in FIGS. 4a and 4b, since the average energy consumption of both logic gates is substantially equal to a plurality of combinations of auxiliary operands at the beginning of a first operation cycle and at the beginning of a second operation cycle, the average energy being derived from a plurality of different orders of occurrences of the first to fourth auxiliary operands.

Preferably, the first logic gate 12 only includes the linear combination between two auxiliary operands, wherein two auxiliary operands include one auxiliary operand from each original operand. It has been found out that, when linear combinations of auxiliary operands are performed there does not exist any DPA-problem with respect to glitches. The second logic gate, however, is constructed using any Boolean function of FIG. 4b.

Subsequently, the construction of non-linear operations AND, OR, NAND, NOR will be discussed with respect to FIGS. 5, 6, 7, and 8.

FIG. 5 illustrates all preferred possible implementations of the first logic gate 12 and the second logic gate 14 using the Boolean functions of FIG. 4b for constructing a masked AND gate. The output value c1 as determined by the logic gate rule g1, when XOR'ed by the output value c2 is determined by gate rule g2 results in the result operand c.

FIG. 6 illustrates 8 possible implementations of an OR-gate. FIG. 6 is different from FIG. 5 in that the input operands into the linear gate are complimentary to the linear terms in the non-linear gate. When, for example, the first gate is considered, it becomes clear that an OR combination can be implemented replacing "a1+b1" by the term "a2+b2" in the linear gate, while not changing the non-linear gate.

When FIG. 7 and FIG. 8 are considered, it becomes clear that the complimentary gate such as NAND (FIG. 7) or NOR (FIG. 8) are obtained by inverting the output of one gate. Inverting the output of one gate is achieved by XOR'ing the value of "1" as it is known in the art. Thus, when the first gate in FIG. 7 is considered, it becomes clear that there are no changes to the linear gate $g_1$, while a "1" has been XOR'ed to the corresponding non-linear gate g2 in FIG. 5.

Generally, it becomes clear from FIGS. 5 to 8 that the non-linear gate $g_2$ is one of the gates shown in FIG. 4b.

Figure 9A:
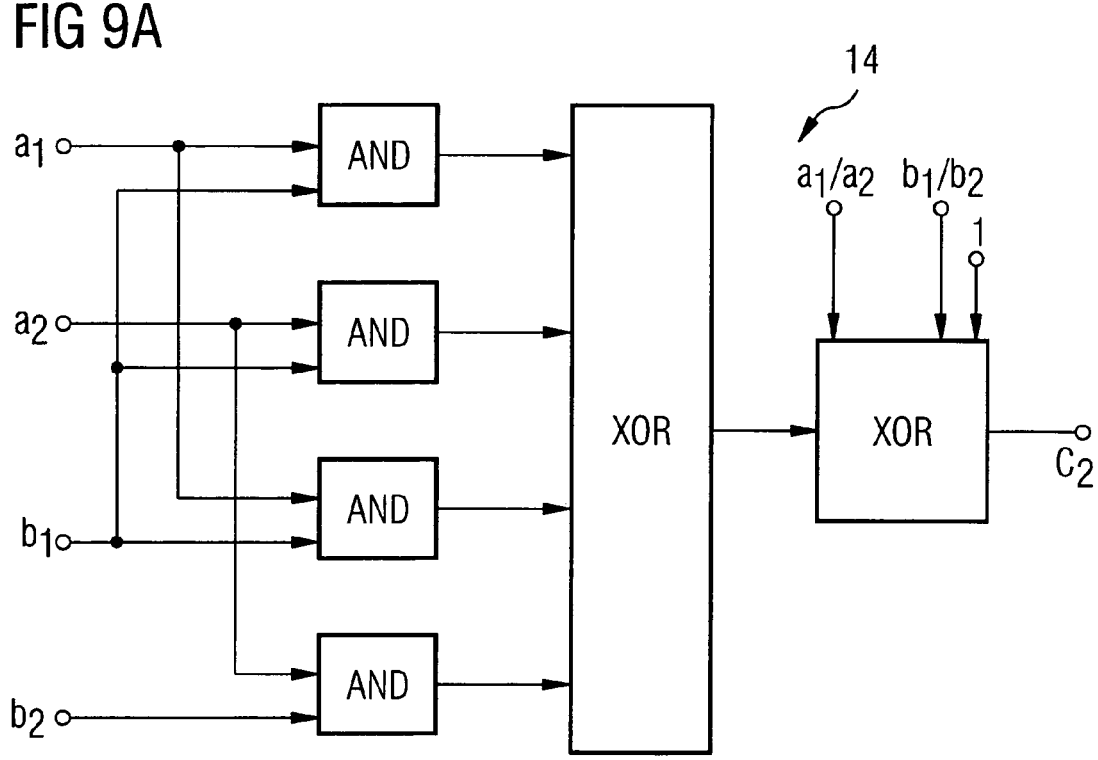

FIG. 9a indicates one implementation of the logic gate rule of FIG. 4b, where there are four AND gates, one XOR-gate collecting the output of the AND-gates, and a final XOR-gate adding certain auxiliary operands or the value of "1".

Figure 9B:
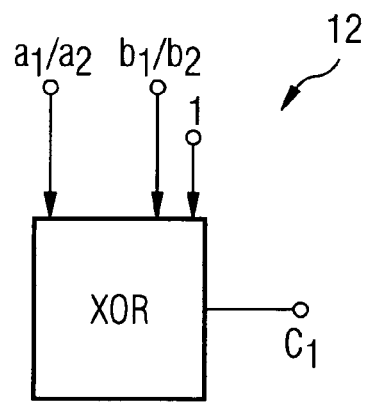
Figure 10:
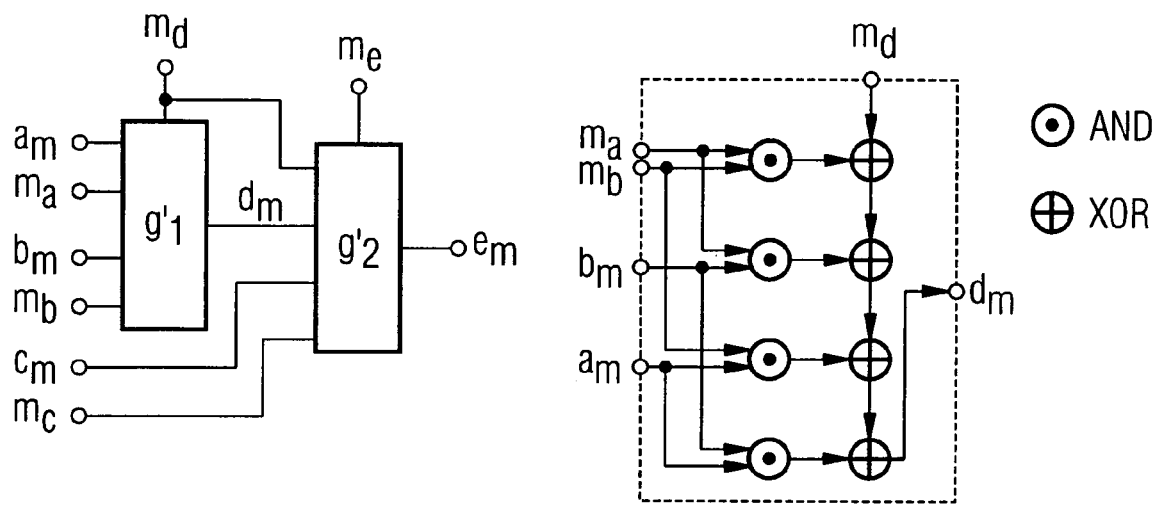
FIG. 10 is an example for a combinational circuit of two masked lifting of gates.

The linear gate 12 of FIG. 1a can be implemented as shown in FIG. 9b, wherein the use of the actual auxiliary operand is determined by the certain non-linear combination.

As to a practical implementation of the first logic gate 12 and the second logic gate 14 of FIG. 1a, it is to be noted that one should use as many common transistors as possible for both logic gates. This implementation makes sure that the constraints for the semi-glitch-equivariance, such as the gate delay requirements and the routing/capacitance requirements in the preferred embodiments are realized as exact as possible.

Figure 1B:
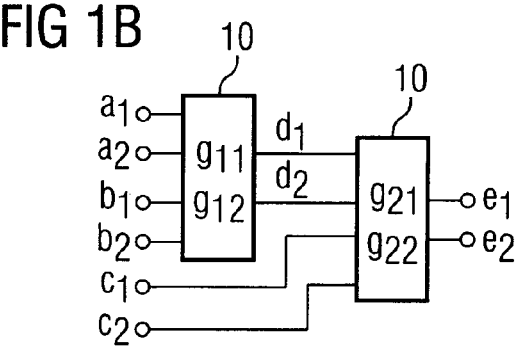

Furthermore, it is to be noted that, as shown in FIG. 1b, the present invention is especially suitable for performing any combinations of any numbers of operands, since, for example, the combination of three operands a, b, c, can be broken down to a combination of two operands to obtain intermediate operands ($d_1$, $d_2$) and a combination of these intermediate operands to the third operand represented by $c_1$ and $c_2$. Each apparatus 10 in FIG. 1b will, again, have a first logic gate ($g_{11}$ and $g_{21}$) and a second logic gate ($g_{12}$ and $g_{22}$), wherein, preferably, the second logic gate of each device 10 includes the logic gate rule of FIG. 4b to be DPA-secure in the presence of glitches.

Figure 1C:
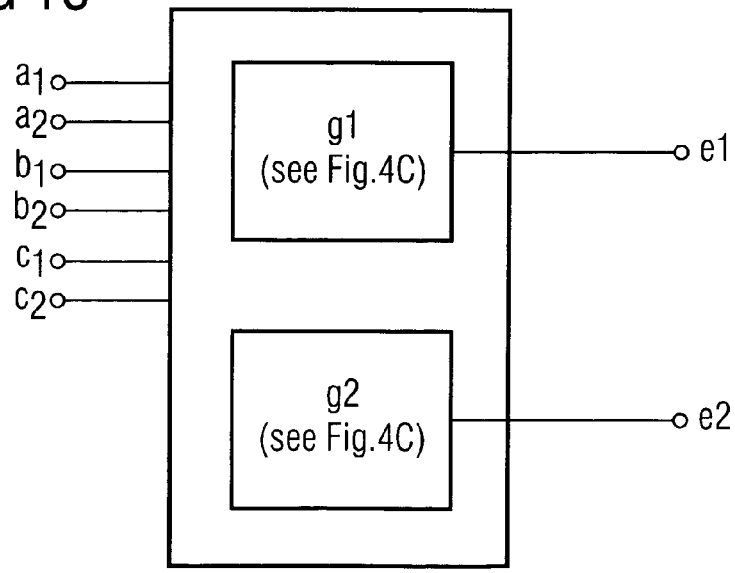
FIG. 1c is a schematic diagram of a lifting representation into two logic gates of a logic operation having three operands represented by six auxiliary operands.

FIG. 1c is a schematic diagram of a lifting representation into two logic gates of a logic operation having three operands represented by six auxiliary operands a1, a2, b1, b2, c1, c2. FIG. 4c shows a set of logic gate definition rules for the logic gates g1 and g2 of FIG. 1c. Each of the first and the second logic gates is designed to fulfil a combination rule obtained from the table in FIG. 4c of to fulfil a combination rule derived from the table of combination rules by exchanging of a1 and a2, exchanging of b1 and b2, exchanging of c1 and c2, permuting the three pairs (a1, a2), (b1, b2) and (c1, c2), inverting a1 or a2, inverting b1 or b2, inverting c1 or c2 or adding (modulo 2) "1" to the result of a combination rule (rule result).

Normally, a circuit designer will select a certain logical operation to be performed by the lifting representation, i.e., the gates g1 and g2. Then, the circuit designer will select a gate rule from the table or derived from the table by the mentioned operations as the first gate g1. Then, the designer will calculate the required logic rule for the second gate g2. Finally, the designer checks, whether the calculated second gate g2 is included in the table or can be derived from the table by the mentioned operation. If the check is positive, the designer has found a glitch resistant lifting representation. If not, the designer has to start again using a different gate rule for gate g1 and to repeat the check until a glitch resistant representation has been found.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

REFERENCES

1. M.-L. Akkar and C. Giraud: An Implementation of DES and AES, Secure against Some Attacks, Cryptographic Hardware and Embedded Systems—CHES 2001, (C. K. Koc, D. Naccache, and C. Paar, Eds.), Lecture Notes in Computer Science, vol. 2162, pp. 309-318, Springer, 2001.
2. M.-L. Akkar, R. Bevan, L. Goubin: Two Power Analysis Attacks against One-Mask Methods, 11th International Workshop on Fast Software Encryption—FSE 2004, (B. K. Roy and W. Meier, Eds.), Lecture Notes in Computer Science, vol. 3017, pp. 332-347, Springer, 2004.
3. R. Bevan and E. Knudsen: Ways to Enhance Differential Power Analysis, ICISC 2002, (P. J. Lee and C. H. Lim, Eds.), Lecture Notes in Computer Science, vol. 2587, pp. 327-342, Springer, 2003.
4. J. Blmer, J. G. Merchan, and V. Krummel: Provably Secure Masking of AES, Selected Areas in Cryptography—SAC 2004, Lecture Notes in Computer Science, vol. 3357, pp. 69-83, Springer, 2004.
5. S. Chari, C. S. Jutla, J. R. Rao, and P. Rohatgi: Towards Sound Approaches to Counteract Power-Analysis Attacks, Advances in Cryptology—CRYPTO'99, (M. J. Wiener, Ed.), Lecture Notes in Computer Science, vol. 1666, pp. 398-412, Springer, 1999.
6. C. Clavier, J.-S. Coron, and N. Dabbous: Differential Power Analysis in the Presence of Hardware Countermeasures, Cryptographic Hardware and Embedded Systems—CHES 2000, (C. K. Koc and C. Paar, Eds.), Lecture Notes in Computer Science, vol. 1965, pp. 252-263, Springer, 2000.
7. J.-S. Coron: Resistance against Differential Power Analysis for Elliptic Curve Cryptosystems, Cryptographic Hardware and Embedded Systems—CHES 1999, (C. K. Koc and C. Paar, Eds.), Lecture Notes in Computer Science, vol. 1717, pp. 292-302, Springer, 1999.
8. J. D. Golic: DeKaRT: A New Paradigm for Key-Dependent Reversible Circuits, Cryptographic Hardware and Embedded Systems—CHES 2003, (C. D. Walter, C. K. Koc, and C. Paar, Eds.), Lecture Notes in Computer Science, vol. 2779, pp. 98-112, Springer, 2003.
9. J. D. Golic and R. Menicocci: Universal Masking on Logic Gate Level, Electronics Letters 40(9), pp. 526-527 (2004).
10. J. D. Golic and C. Tymen: Multiplicative Masking and Power Analysis of AES, Cryptographic Hardware and Embedded Systems—CHES 2002, (B. S. Kaliski Jr., C. K. Koc, and C. Paar, Eds.), Lecture Notes in Computer Science, vol. 2535, pp. 198-212, Springer, 2003.
11. L. Goubin and J. Patarin: DES and Differential Power Analysis—The Duplication Method, Cryptographic Hardware and Embedded Systems—CHES 1999, (C. K. Koc and C. Paar, Eds.), Lecture Notes in Computer Science, vol. 1717, pp. 158-172, Springer, 1999.
12. Y. Ishai, A. Sahai, and D. Wagner: Private Circuits: Securing Hardware against Probing Attacks, Advances in Cryptology—CRYPTO 2003, (D. Boneh, Ed.), Lecture Notes in Computer Science, vol. 2729, pp. 463-481, Springer, 2003.
13. P. C. Kocher, J. Jaffe, and B. Jun: Differential Power Analysis, Advances in Cryptology—CRYPTO'99, (M. J. Wiener, Ed.), Lecture Notes in Computer Science, vol. 1666, pp. 388-397, Springer, 1999.

14. S. Mangard: Hardware Countermeasures against DPA—A Statistical Analysis of Their Effectiveness, Topics in Cryptology—CT-RSA 2004, (T. Okamoto, Ed.), Lecture Notes in Computer Science, vol. 2964, pp. 222-235, Springer, 2004.
15. S. Mangard, T. Popp, B. M. Gammel: Side-Channel Leakage of Masked CMOS Gates, Topics in Cryptology—CT-RSA 2005, (A. Menezes, Ed.), Lecture Notes in Computer Science, vol. 3376, pp. 351-365, Springer, 2005.
16. T. S. Messerges: Securing the AES Finalists Against Power Analysis Attacks, 7th International Workshop on Fast Software Encryption—FSE 2000, (B. Schneier, Ed.), Lecture Notes in Computer Science, vol. 1978, pp. 150-164, Springer, 2001.
17. T. S. Messerges, E. A. Dabbish, and L. Puhl: Method and Apparatus for Preventing Information Leakage Attacks on a Microelectronic Assembly, U.S. Pat. No. 6,295,606, Sep. 25, 2001, available at http://www.uspto.gov/.
18. T. S. Messerges, E. A. Dabbish, and R. H. Sloan: Power Analysis Attacks of Modular Exponentiation in Smartcards, Cryptographic Hardware and Embedded Systems—CHES 1999, (C. K. Koc and C. Paar, Eds.), Lecture Notes in Computer Science, vol. 1717, pp. 144-157, Springer, 1999.
19. T. S. Messerges, E. A. Dabbish, and R. H. Sloan: Examining Smart-Card Security under the Threat of Power Analysis Attacks, IEEE Transactions on Computers, 51(5), pp. 541-552, 2002.
20. B. Preneel, R. Govaerts, J. Vandewalle: Boolean Functions Satisfying Higher Order Propagation Criteria, Advances in Cryptology—EUROCRYPT'91, (D. W. Davies, Ed.), Lecture Notes in Computer Science, vol. 547, pp. 141-152, Springer, 1991.
21. J. M. Rabaey: Digital Integrated Circuits, Prentice Hall, 1996, ISBN 0-13-178609-1.
22. A. Shamir: Protecting Smart Cards from Passive Power Analysis with Detached Power Supplies, Cryptographic Hardware and Embedded Systems—CHES 2000, (C. K. Koc and C. Paar, Eds.), Lecture Notes in Computer Science, vol. 1965, pp. 71-77, Springer, 2000.
23. D. Suzuki, M. Saeki, and T. Ichikawa: Random Switching Logic: A Countermeasure against DPA based on Transition probability, Cryptology ePrint Archive, Report 2004/346 (http://eprint.iacr.org/).
24. K. Tiri and I. Verbauwhede: Securing Encryption Algorithms against DPA at the Logic Level: Next Generation Smart Card Technology, Cryptographic Hardware and Embedded Systems—CHES 2003, (C. D. Walter, C. K. Koc, and C. Paar, Eds.), Lecture Notes in Computer Science, vol. 2779, pp. 137-151, Springer, 2003.
25. K. Tiri and I. Verbauwhede: A Logic Level Design Methodology for a Secure DPA Resistant ASIC or FPGA Implementation, Proc. of Design, Automation and Test in Europe Conference—DATE 2004, IEEE Computer Society, pp. 246-251, 2004.
26. E. Trichina: Combinational Logic Design for AES Sub-Byte Transformation on Masked Data, Cryptology ePrint Archive, Report 2003/236 (http://eprint.iacr.org/).
27. E. Trichina and T. Korkishko: Small Size, Low Power, Side Channel-Immune AES Coprocessor: Design and Synthesis Results, Proc. of the Fourth Conference on the Advanced Encryption Standard (AES), Bonn, Germany, May 2004.
28. E. Trichina, D. De Seta, and L. Germani: Simplified Adaptive Multiplicative Masking for AES, Cryptographic Hardware and Embedded Systems—CHES 2002, (B. S. Kaliski Jr., C. K. Koc, and C. Paar, Eds.), Lecture Notes in Computer Science, vol. 2535, pp. 187-197, Springer, 2003.

What is claimed is:

1. An apparatus for calculating a representation of a result operand of a non-linear logical operation between at least a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising:

a first logic gate implemented on a transistor level using a plurality of transistors, the first logic gate being configured for calculating a fifth auxiliary operand based on at least two auxiliary operands, the at least two auxiliary operands including one of the first and second auxiliary operands and one of the third and fourth auxiliary operands; and a second logic gate implemented on a transistor level using a plurality of transistors, the second logic gate being configured for calculating a sixth auxiliary operand based on at least the first to fourth auxiliary operands, wherein the first and second logic gates are designed such that the fifth and sixth auxiliary operands when linearly combined, result in the result operand, and wherein the first and second logic gates are designed such that an average energy consumption of the first logic gate or an average energy consumption of the second logic gate is substantially equal to a plurality of combinations of auxiliary operands at the beginning of a first operation cycle and auxiliary operands at the beginning of a second operation cycle, the average energy being derivable from a plurality of different orders of occurrences of the first to fourth auxiliary operands.

2. The apparatus in accordance with claim 1, wherein the first logic gate only includes linear combinations between at least two auxiliary operands, and wherein the second logic gate is designed in accordance with a logic combination rule involving non-linear combinations of at least two auxiliary operands.

3. The apparatus in accordance with claim 1, wherein the first logic gate and the second logic gate are implemented on a transistor level such that a plurality of transistors are commonly used for the first logic gate and the second logic gate.

4. The apparatus in accordance with claim 2, wherein the second logic gate comprises a non-linear operation between each of the first and second auxiliary operands and each of the third and fourth auxiliary operands.

5. The apparatus in accordance with claim 1, wherein the second logic gate comprises an XOR-addition of the value "1".

6. The apparatus in accordance with claim 4, wherein the non-linear combination is an AND combination.

7. The apparatus in accordance with claim 1, wherein the linear combination for the first operand or the second operand or the result operand is an XOR or XNOR combination.

8. The apparatus in accordance with claim 1, wherein the non-linear logical operation is an AND, OR, NAND, or NOR operation.

9. The apparatus in accordance with claim 1, wherein the second logic gate is designed to fulfil one of the following combination rules:

$$\begin{array}{|l|}\hline c+a_1+b_1\\ c+a_1+b_2\\ c+a_2+b_1\\ c+a_2+b_2\\\hline\end{array}\begin{array}{|l|}\hline c+a_1\\ c+a_2\\ c+b_1\\ c+b_2\\\hline\end{array}\begin{array}{|lllll|}\hline c,&c+a_1b_1&c+a_1+a_1b_1&c+b_1+a_1b_1&c+a_1+b_1+a_1b_1\\ &c+a_1b_2,&c+a_1+a_1b_2,&c+b_1+a_2b_1,&c+a_1+b_2+a_1b_2\\ &c+a_2b_1,&c+a_2+a_2b_1,&c+b_2+a_1b_2,&c+a_2+b_1+a_2b_1\\ &c+a_2b_2&c+a_2+a_2b_2,&c+b_2+a_2b_2,&c+a_2+b_2+a_2b_2\\\hline\end{array}$$

wherein c can be equal to 0 or equal to 1, $a_1$ is the first auxiliary operand, $a_2$ is the second auxiliary operand, $b_1$ is the third auxiliary operand, $b_2$ is the fourth auxiliary operand, and "+" is an XOR combination.

10. The apparatus in accordance with claim 1, wherein the second logic gate is designed to fulfil one of the following combination rules:

$$\begin{array}{|l|}\hline c+a_1+b_1+a_1b_1+a_1b_2+a_2b_1+a_2b_2\\ c+a_1+b_2+a_1b_1+a_1b_2+a_2b_1+a_2b_2\\ c+a_2+b_1+a_1b_1+a_1b_2+a_2b_1+a_2b_2\\ c+a_2+b_2+a_1b_1+a_1b_2+a_2b_1+a_2b_2\\\hline\end{array},$$

wherein c can be equal to 0 or equal to 1, $a_1$ is the first auxiliary operand, $a_2$ is the second auxiliary operand, $b_1$ is the third auxiliary operand, $b_2$ is the fourth auxiliary operand, and "+" is an XOR combination.

11. The apparatus in accordance with claim 1, wherein the logical function involves three operands, wherein the, third operand is represented by a fifth auxiliary operand, and a sixth auxiliary operand, the fifth and sixth auxiliary operands resulting in the third operand, when combined using a linear combination, and in which each of the first and the second logic gates is designed to fulfil combination rules from the following table of combination rules:

```
1
a2 + b2 + a2 * b2 + c2 + a2 * c2 + b2 * c2 + a2 * b2 * c2
a2 + a2 * b2 + a2 * c2 + a2 * b2 * c2
b2 + c2 + b2 * c2
a2 + b2 + a2 * c2 + b2 * c2
a2 * b2 + c2 + a2 * b2 * c2
a2 + a1 * b1 + a2 * b1 + b2 + a1 * b2 + a2 * b2 + a2 * c2 + a1 * b1 *
c2 + a2 * b1 * c2 + b2 * c2 + a1 * b2 * c2 + a2 * b2 * c2
a2 * b2 + a2 * b2 * c2
a2 + b2 + c2 + a2 * c2 + b2 * c2
a2 + a2 * c2
b2 + a2 * b2 + c2 + b2 * c2 + a2 * b2 * c2
a2 + b2 + a2 * b2 + a2 * c2 + b2 * c2 + a2 * b2 * c2
c2
a2 + b2 + c2 + a2 * b2 * c2
a2 * b2 + a2 * c2 + b2 * c2
a2 * b2 + c2 + a2 * c2 + b2 * c2
a2 + b2 + a2 * b2 * c2
a2 + c2 + b2 * c2 + a2 * b2 * c2
b2 + a2 * b2 + a2 * c2
a2 + b2 + a2 * b2 + c2
a2 * c2 + b2 * c2 + a2 * b2 * c2
a2 + b2 + a2 * b2 + c1 + b2 * c1 + b2 * c2
a2 + b2 + a2 * b2 + a2 * c1 + b2 * c1 + c2 + a2 * c2 + b2 * c2
a1 + b2 + a1 * b2 + c1 + a1 * c1 + a2 * c1 + b2 * c1 + a1 * b2 * c1 +
a2 * b2 * c1 + a1 * c2 + a2 * c2 + b2 * c2 + a1 * b2 * c2 + a2 * b2 * c2
a1 + b2 + a1 * b2 + a1 * c1 + b2 * c1 + a1 * b2 * c1 + a2 * b2 * c1 +
c2 + a1 * c2 + b2 * c2 + a1 * b2 * c2 + a2 * b2 * c2
a2 * b2 + a2 * c2
a2 + b2 + c2 + b2 * c2 + a2 * b2 * c2
a2 + a2 * b2 * c2
b2 + a2 * b2 + c2 + a2 * c2 + b2 * c2
b2 + a2 * c2 + b2 * c2 + a2 * b2 * c2
```

-continued

```
a2 + a2 * b2 + c2
a2 + b2 + a2 * b2 + b2 * c2
c2 + a2 * c2 + a2 * b2 * c2
a2 * b2 + a2 * b1 * c1 + a2 * b2 * c1 + a2 * c2 + a2 * b1 * c2 + a2 *
b2 * c2
a2 + a2 * b2 + a2 * c1 + b2 * c1 + c2 + a2 * c2 + b2 * c2
a2 + a2 * b2 + c1 + a2 * c1 + a2 * c2
a2 + a2 * b2 + a2 * c1 + b2 * c1 + a1 * b2 * c1 + a2 * b2 * c1 + c2 +
a2 * c2 + b2 * c2 + a1 * b2 * c2 + a2 * b2 * c2
b2 + c2
a2 + a2 * b2 + a2 * c2 + b2 * c2 + a2 * b2 * c2
a2 + b2 + a2 * b2 + c2 + a2 * c2 + a2 * b2 * c2
b2 * c2
b2 + b1 * c1 + b2 * c1 + c2 + b1 * c2 + b2 * c2
a1 + b1 + a1 * b1 + a1 * c1 + b1 * c1 + a1 * b1 * c1 + a2 * b2 * c1 +
c2 + a1 * c2 + b1 * c2 + a1 * b1 * c2 + a2 * b2 * c2
a2 + a2 * b1 + c1 + a2 * c1 + a2 * b1 * c1 + a2 * b2 * c1 + a2 * c2 +
a2 * b1 * c2 + a2 * b2 * c2
a2 + a2 * b1 + a2 * c1 + a2 * b1 * c1 + b2 * c1 + a1 * b2 * c1 + c2 +
a2 * c2 + a2 * b1 * c2 + b2 * c2 + a1 * b2 * c2
a2 * b2 + a2 * c2 + b2 * c2 + a2 * b2 * c2
a2 + b2 + c2
a2 + b2 * c2
b2 + a2 * b2 + c2 + a2 * c2 + a2 * b2 * c2
a2 + b2 + a2 * b2 + a2 * b2 * c2
c2 + a2 * c2 + b2 * c2
a2 + b2 + a1 * b1 * c1 + a2 * b1 * c1 + a1 * b2 * c1 + a2 * b2 * c1 +
c2 + a1 * b1 * c2 + a2 * b1 * c2 + a1 * b2 * c2 + a2 * b2 * c2
a2 + b2 + b1 * c1 + b2 * c1 + c2 + b1 * c2 + b2 * c2
a2 + b2 + a1 * c1 + a2 * c1 + b1 * c1 + b2 * c1 + c2 + a1 *
c2 + a2 * c2 + b1 * c2 + b2 * c2
a2 + b2 + a2 * b2 + c2 + a2 * c2 + b2 * c2
a2 * b2 * c2
a2 + a1 * b1 + a2 * b1 + b2 + a1 * b2 + a2 * b2 + a1 * c1 + a2 *
c1 + b1 * c1 + b2 * c1 + c2 + a1 * c2 + a2 * c2 + b1 * c2 + b2 * c2
``` wherein $c_1$ is the fifth auxiliary operand, $c_2$ is the sixth auxiliary operand, $a_1$ is the first auxiliary operand, $a_2$ is the second auxiliary operand, $b_1$ is the third auxiliary operand, $b_2$ is the fourth auxiliary operand, "+" is an XOR combination, and * is an AND operation, or wherein each of the first and the second logic gates is designed to fulfil a combination rule obtained from the table of combination rules by one of the following operations or an arbitrary combination of the following combination rules:

exchanging a1 and a2, exchanging b1 and b2, exchanging c1 and c2, permuting three pairs (a1, a2), (b1, b2) and (c1, c2), inverting a1 or a2, inverting b1 or b2, inverting c1 or c2, and adding 1 to a rule result.

12. The apparatus in accordance with claim 1, wherein the first logic gate is designed such that an average energy consumption of the first logic gate is substantially equal to a plurality of combinations of auxiliary operands at the beginning of the first operation cycle and auxiliary operands at the beginning of the second operation cycle, the average energy being derivable from a plurality of different orders of occurrences of the first to fourth auxiliary operands, and wherein the second logic gate is designed such that an average energy consumption of the second logic gate is substantially equal to a plurality of combinations of auxiliary operands at the beginning of the first operation cycle and auxiliary operands at the beginning of the second operation cycle, the average energy being derivable from a plurality of different orders of occurrences of the first to fourth auxiliary operands.

13. The apparatus in accordance with claim 1, wherein the first and second logic gates are implemented on a transistor level to have substantially the same capacitive load.

14. The apparatus in accordance with claim 1, wherein the first and second logic gates are implemented on a transistor level to have substantially the same gate delay.

15. The apparatus in accordance with claim 1, wherein the first and second logic gates are designed on a transistor level to have substantially the same propagation times for the first and second auxiliary operands, or for the third and fourth auxiliary operands.

16. The apparatus in accordance with claim 1, wherein the first or second logic gate is designed on a transistor level so that the pair of the first and second auxiliary operands or the pair of the third and fourth auxiliary operands have the same gate depth in the logic gates.

17. The apparatus in accordance with claim 1, wherein the first and second logic gates are designed in a CMOS circuit technology.

18. The apparatus in accordance with claim 1, wherein the first logic gate is implemented using one of the following combination rules:

a1+b1+c
a1+b2+c
a2+b1+c
a2+b2+c wherein a1 is the first auxiliary parameter, a2 is the second auxiliary parameter, b1 is the third auxiliary parameter, b2 is the fourth auxiliary parameter, c is equal to 0 or equal to 1, and "+" is an XOR combination.

19. A method of calculating a representation of a result operand of a non-linear logical operation between at least a first operand and a second operand, the method being performed by a hardware apparatus, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising:

calculating a fifth auxiliary operand based on at least two auxiliary operands using a first logic gate implemented on a transistor level using a plurality of transistors, the at least two auxiliary operands comprising one of the first and second auxiliary operands and one of the third and fourth auxiliary operands and;

calculating a sixth auxiliary operand based on at least the first to fourth auxiliary operands using a second logic gate implemented on a transistor level using a plurality of transistors, wherein the first and second logic gates are designed such that the fifth and sixth auxiliary operands when linearly combined, result in the result operand, and wherein the first and second logic gates are designed such that an average energy consumption of the first or an average energy consumption of the second logic gate is substantially equal to a plurality of combinations of auxiliary operands at the beginning of the first operation cycle and of auxiliary operands at the beginning of a second operation cycle, the average energy being derivable from a plurality of different orders of occurrences of the first to fourth auxiliary operands.

20. A digital storage medium having stored thereon a computer program having a program code for performing a method of calculating a representation of a result operand of a non-linear logical operation between a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, when the computer program runs on a computer, the method comprising the steps of:

calculating a fifth auxiliary operand based on at least two auxiliary operands using a first logic gate implemented on a transistor level using a plurality of transistors, the at least two auxiliary operands comprising one of the first and second auxiliary operands and one of the third and fourth auxiliary operands; and calculating a sixth auxiliary operand based on the first to fourth auxiliary operands using a second logic gate implemented on a transistor level using a plurality of transistors, wherein the first and second logic gates are designed such that the fifth and sixth auxiliary operands when linearly combined, result in the result operand, and wherein the first and second logic gates are designed such that an average energy consumption of the first or second logic gate is substantially equal to a plurality of combinations of auxiliary operands at the beginning of the first operation cycle and of auxiliary operands at the beginning of a second operation cycle, the average energy being derivable from a plurality of different orders of occurrences of the first to fourth auxiliary operands.

21. An apparatus for calculating a representation of a result operand of a non-linear logical operation between at least a first operand and a second operand, the first operand being represented by a first auxiliary operand, and a second auxiliary operand, the first and second auxiliary operands resulting in the first operand, when combined using a linear combination, the second operand being represented by a third auxiliary operand and a fourth auxiliary operand, the third and fourth auxiliary operands resulting in the second operand when combined using a linear combination, comprising:

a first logic means implemented on a transistor level using a plurality of transistors, the first logic means being configured for calculating a fifth auxiliary operand based on at least two auxiliary operands, the at least two auxiliary operands comprising one of the first and second auxiliary operands and one of the third and fourth auxiliary operands; and a second logic means implemented on a transistor level using a plurality of transistors, the second logic m being configured for calculating a sixth auxiliary operand based on at least the first to fourth auxiliary operands, wherein the first and second logic means are designed such that the fifth and sixth auxiliary operands when linearly combined, result in the result operand, and wherein the first and second logic means are designed such that an average energy consumption of the first logic means or an average energy consumption of the second logic means is substantially equal to a plurality of combinations of auxiliary operands at the beginning of a first operation cycle and auxiliary operands at the beginning of a second operation cycle, the average energy being derivable from a plurality of different orders of occurrences of the first to fourth auxiliary operands.

22. The apparatus in accordance with claim 21, wherein the first logic means only comprises linear combinations between at least two auxiliary operands, and wherein the second logic means is designed in accordance with a logic combination rule involving non-linear combinations of at least two auxiliary operands.

23. The apparatus in accordance with claim 21, wherein the first logic means and the second logic means are implemented on a transistor level such that a plurality of transistors are commonly used for the first logic means and the second logic means.

24. The apparatus in accordance with claim 22, wherein the second logic means comprises a non-linear operation between each of the first and second auxiliary operands and each of the third and fourth auxiliary operands.

25. The apparatus in accordance with claim 21, wherein the first logic means is designed such that an average energy consumption of the first logic means is substantially equal to a plurality of combinations of auxiliary operands at the beginning of the first operation cycle and auxiliary operands at the beginning of the second operation cycle, the average energy being derivable from a plurality of different orders of occurrences of the first to fourth auxiliary operands, and wherein the second logic means is designed such that an average energy consumption of the second logic means is substantially equal to a plurality of combinations of auxiliary operands at the beginning of the first operation cycle and auxiliary operands at the beginning of the second operation cycle, the average energy being derivable from a plurality of different orders of occurrences of the first to fourth auxiliary operands.

* * * * *